(12) United States Patent
Benjebbour et al.

(10) Patent No.: US 10,791,469 B2
(45) Date of Patent: Sep. 29, 2020

(54) RADIO BASE STATION, USER TERMINAL AND RADIO COMMUNICATION METHOD

(71) Applicant: NTT DOCOMO, INC., Tokyo (JP)

(72) Inventors: Anass Benjebbour, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/912,789

(22) PCT Filed: Aug. 6, 2014

(86) PCT No.: PCT/JP2014/070729
§ 371 (c)(1),
(2) Date: Feb. 18, 2016

(87) PCT Pub. No.: WO2015/025714
PCT Pub. Date: Feb. 26, 2015

(65) Prior Publication Data
US 2016/0204920 A1 Jul. 14, 2016

(30) Foreign Application Priority Data
Aug. 21, 2013 (JP) ................................. 2013-171534

(51) Int. Cl.
*H04W 16/28* (2009.01)
*H04B 1/7143* (2011.01)
(Continued)

(52) U.S. Cl.
CPC .......... *H04W 16/28* (2013.01); *H04B 1/7143* (2013.01); *H04W 16/32* (2013.01);
(Continued)

(58) Field of Classification Search
CPC ..... H04W 16/28; H04W 16/32; H04W 52/40; H04W 84/045; H04B 1/7143; H04L 5/0048
(Continued)

(56) References Cited

U.S. PATENT DOCUMENTS 5,345,599 A * 9/1994 Paulraj ................. H04B 7/0848
342/367
8,548,479 B2 * 10/2013 Kim ................... H04W 36/0055
370/331
(Continued)

FOREIGN PATENT DOCUMENTS

CN 101502029 A 8/2009
CN 101578771 A 11/2009

OTHER PUBLICATIONS

International Search Report issued in PCT/JP2014/070729 dated Nov. 4, 2014 (1 page).
(Continued)

Primary Examiner — Chi Tang P Cheng
(74) Attorney, Agent, or Firm — Osha Liang LLP

(57) ABSTRACT

The present invention is designed to expand the coverage of reference signals in small cells that are arranged to overlap a macro cell, and, furthermore, reduce the interference between the small cells and improve the received quality of the reference signals in user terminals. The radio communication method of the present invention provides a radio communication method in a radio base station forming a small cell that is placed to overlap a macro cell, and includes the steps of generating a reference signal for measuring received quality, in a first transmission period in which beamforming is not executed, transmitting the reference signal in a narrower transmission bandwidth and with greater transmission power than in a second transmission period in which beamforming is executed, and allocating the
(Continued)

reference signal to a band associated with information that is specific to each radio base station forming a small cell, and transmitting the reference signal.

4 Claims, 20 Drawing Sheets

(51) Int. Cl.
    *H04W 52/40*           (2009.01)
    *H04W 16/32*           (2009.01)
    *H04W 84/04*           (2009.01)
    *H04L 5/00*             (2006.01)

(52) U.S. Cl.
    CPC ........... *H04W 52/40* (2013.01); *H04L 5/0048* (2013.01); *H04W 84/045* (2013.01)

(58) Field of Classification Search
    USPC ........................................................ 370/329
    See application file for complete search history.

(56) References Cited

U.S. PATENT DOCUMENTS

| | | | | |
|---|---|---|---|---|
| 9,271,298 | B1* | 2/2016 | Talley | H04W 72/0486 |
| 2005/0124345 | A1* | 6/2005 | Laroia | H04W 36/06 |
| | | | | 455/437 |
| 2006/0056360 | A1* | 3/2006 | Parkvall | H04B 1/7103 |
| | | | | 370/335 |
| 2010/0056160 | A1 | 3/2010 | Kim et al. | |
| 2010/0103906 | A1 | 4/2010 | Montojo et al. | |
| 2010/0123618 | A1* | 5/2010 | Martin | H01Q 1/246 |
| | | | | 342/174 |
| 2010/0220808 | A1* | 9/2010 | Kishigami | H04L 25/0232 |
| | | | | 375/295 |
| 2011/0211622 | A1* | 9/2011 | Wang | H04B 7/0408 |
| | | | | 375/220 |
| 2012/0163223 | A1* | 6/2012 | Lo | H04L 5/0007 |
| | | | | 370/252 |
| 2012/0178484 | A1* | 7/2012 | Liu | H04J 11/0053 |
| | | | | 455/513 |
| 2014/0185537 | A1* | 7/2014 | Papasakellariou | H04L 5/003 |
| | | | | 370/329 |
| 2015/0043520 | A1* | 2/2015 | Sun | H04L 5/001 |
| | | | | 370/330 |

OTHER PUBLICATIONS

Written Opinion of the International Searching Authority issued in PCT/JP2014/070729 dated Nov. 4, 2014 (3 pages).
3GPP TR 36.814 V9.0.0; "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (104 pages).
Office Action issued in the counterpart Chinese Patent Application No. 201480046043.1, dated Jul. 3, 2018 (14 pages).
Office Action issued in Chinese Application No. 201910047028.3; dated Jul. 20, 2020 (16 pages).

* cited by examiner

2GHz

4GHz

| | 2.5 GHz | 3.5 GHz | 5 GHz | 10 GHz | 20 GHz |
|---|---|---|---|---|---|
| NUMBER OF ANTENNA ELEMENTS (Tx) | 1 | 2 | 4 | 16 | 64 |
| BEAMFORMING GAIN (dB) | 0 dB | 3 dB | 6 dB | 12 dB | 18 dB |

FIG.5

RADIO BASE STATION, USER TERMINAL AND RADIO COMMUNICATION METHOD

TECHNICAL FIELD

The present invention relates to a radio base station, a user terminal and a radio communication method in a next-generation mobile communication system in which a macro cell and a small cell are placed to overlap each other.

BACKGROUND ART

In LTE (Long Term Evolution) and successor systems of LTE (referred to as, for example, "LTE-advanced," "FRA (Future Radio Access)," "4G," etc.), a radio communication system (referred to as, for example, "HetNet" (Heterogeneous Network)) to place small cells (including pico cells, femto cells and so on) having a relatively small coverage of a radius of approximately several meters to several tens of meters, in a macro cell having a relatively large coverage of a radius of approximately several hundred meters to several kilometers, is under study (see, for example, non-patent literature 1).

Regarding this radio communication system, a scenario to use the same frequency band in both the macro cell and the small cells (also referred to as, for example, "co-channel") and a scenario to use different frequency bands between the macro cell and the small cells (also referred to as, for example, "separate frequencies") are under study. To be more specific, the latter scenario is under study to use a relatively low frequency band (for example, 2 GHz) (hereinafter referred to as the "low frequency band") in the macro cell, and use a relatively high frequency band (for example, 3.5 GHz or 10 GHz) (hereinafter referred to as the "high frequency band") in the small cells.

CITATION LIST

Non-Patent Literature

Non-patent Literature 1: Non-Patent Literature 1: 3GPP TR 36.814, "E-UTRA Further Advancements for E-UTRA Physical Layer Aspects"

SUMMARY OF INVENTION

Technical Problem

In a radio communication system in which the macro cell uses the low frequency band and the small cells use the high frequency band, it is preferable that user terminals communicate in the small cells, where the high frequency band of the greater capacity is used, from the perspective of increase in capacity, offloading and so on.

Meanwhile, since the path loss of the high frequency band is significant compared to the path loss of the low frequency band, it is difficult to secure a wide coverage with the high frequency band. Consequently, a study is in progress to perform transmission by increasing the transmission power of reference signals, for the purpose of expanding the coverages of the small cells. However, when the transmission power of reference signals is increased, there is a threat that interference is produced between the small cells, and the received quality of the reference signals in user terminals decreases.

The present invention has been made in view of the above, and it is therefore an object of the present invention to provide a radio base station, a user terminal and a radio communication method, which, in small cells that are arranged to overlap a macro cell, can expand the coverage of reference signals, and, furthermore, improve the received quality of reference signals in user terminals.

Solution to Problem

The radio base station of the present invention provides a radio base station to form a small cell that is placed to overlap a macro cell, and this radio base station has a generating section that generates a reference signal for measuring received quality, and a transmission section that, in a first transmission period in which beamforming is not executed, transmits the reference signal in a narrower transmission bandwidth and with greater transmission power than in a second transmission period in which beamforming is executed, and the transmission section allocates the reference signal to a band associated with information that is specific to each radio base station forming a small cell, and transmits the reference signal.

According to the present invention, in small cells that are arranged to overlap a macro cell, it is possible to expand the coverage of reference signals, and, furthermore, reduce the interference between the small cells and improve the received quality of reference signals in user terminals.

FIG. 5 is a diagram to explain the (two-dimensional) relationship between frequency and the number of antenna elements;

DESCRIPTION OF EMBODIMENTS

Figure 1:
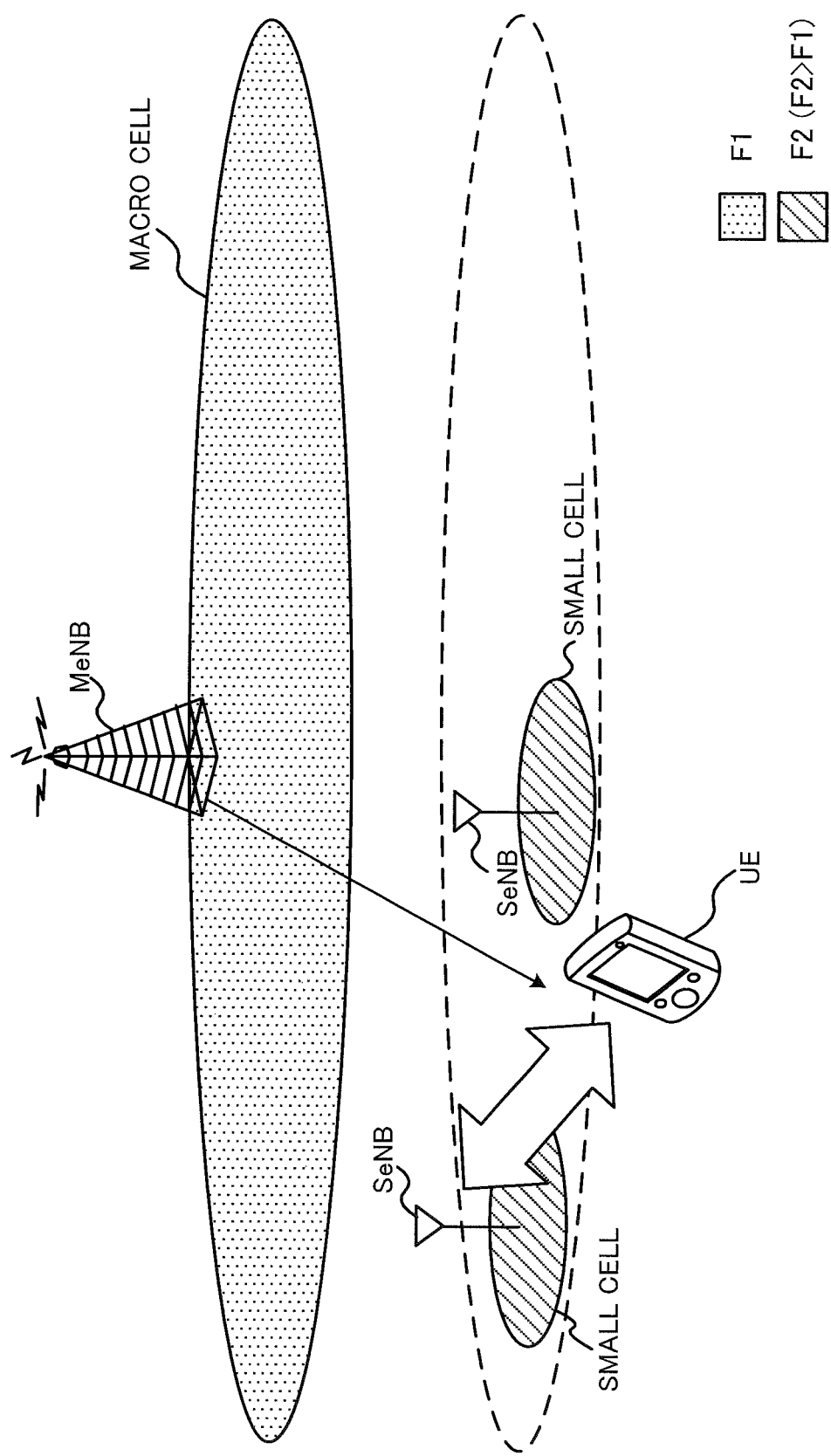
FIG. 1 is a conceptual diagram of a HetNet.

FIG. 1 is a conceptual diagram of a HetNet. As shown in FIG. 1, a HetNet refers to a radio communication system in which small cells are arranged to overlap a macro cell geographically. A HetNet includes a radio base station that forms a macro cell (hereinafter referred to as a "macro base station" or "MeNB (Macro eNodeB)"), radio base stations that each form a small cell (hereinafter referred to as "small base stations" or "SeNBs (Small eNodeBs)"), and a user terminal (UE: User Equipment) that communicates with at least one of the macro base station and the small base stations.

In the HetNet shown in FIG. 1, a study is in progress to use a carrier F1 of a relatively low frequency band (hereinafter referred to as the "low frequency band") in the macro cell, and use a carrier F2 of a relatively high frequency band (hereinafter referred to as the "high frequency band") in the small cells. In this case, a study is also in progress to secure coverage and provide mobility support in the macro cell that uses the carrier F1 of the low frequency band, and increase capacity and carry out off-loading in the small cells that use the carrier F2 of the high frequency band (also referred to as "macro-assisted," "C/U-plane split," etc.).

Figure 2:
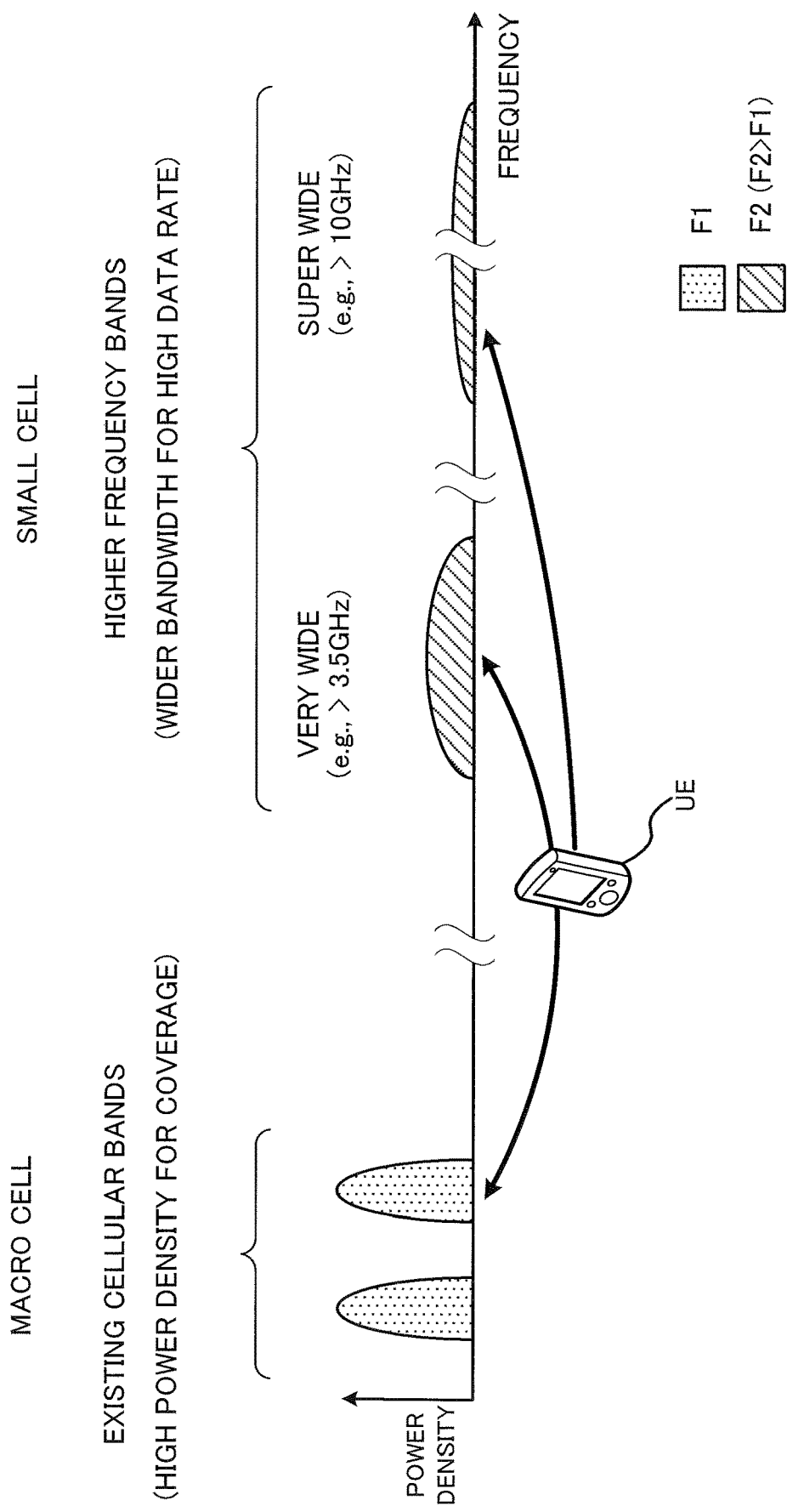
FIG. 2 is a diagram to explain examples of carriers used in a macro cell and a small cell.

FIG. 2 is a diagram to show examples of the carriers F1 and F2. As shown in FIG. 2, it is possible to use a carrier of an existing frequency band (existing cellular band), such as, for example, 800 Hz or 2 GHz, for the carrier F1 of the low frequency band. On the other hand, as for the carrier F2 of the high frequency band, it is possible to use a carrier of a higher frequency band than the existing frequency band, such as, for example, 3.5 GHz or 10 GHz.

As shown in FIG. 2, the transmission power density of the carrier F1 is higher than the transmission power density of the carrier F2, so that the macro cell has a greater coverage than the small cells. Meanwhile, the transmission bandwidth (bandwidth) of the carrier F2 can be secured wider than the transmission bandwidth of the carrier F1, so that the small cells achieve higher transmission speeds (capacity) than the macro cell.

Now, path loss increases in proportion to frequency f. To be more specific, path loss is roughly represented by 20*log10 (f). Consequently, for the small cells where the carrier F2 of the high frequency band is used, a study is in progress to compensate for path loss by applying beamforming by means of massive MIMO (also referred to as "three-dimensional (3D)/massive MIMO") and so on.

Figure 3:
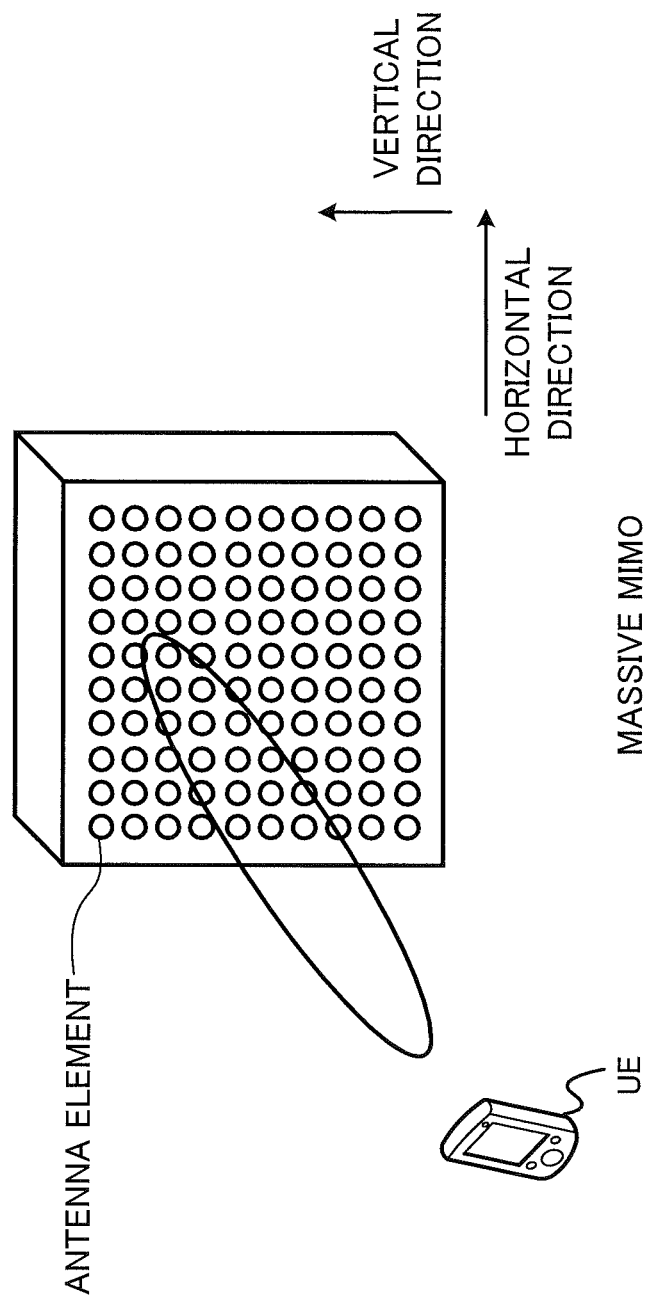
FIG. 3 is a diagram to explain massive MIMO.

FIG. 3 is a diagram to explain massive MIMO. When massive MIMO is used, a plurality of antenna elements are arranged on a two-dimensional plane. For example, as shown in FIG. 3, a plurality of antenna elements may be arranged evenly between the horizontal direction and the vertical direction on a two-dimensional plane. In this case, in theory, the number of antenna elements that can be arranged on the two-dimensional plane increases in proportion to the square of frequency f. Note that, although not illustrated, a plurality of antenna elements may be arranged three-dimensionally as well.

Now, the relationship between frequency f and the number of antenna elements will be described with reference to FIG. 4 and FIG. 5. FIG. 4 and FIG. 5 are diagrams to explain the relationship between frequency f and the number of antenna elements.

Figure 4A:
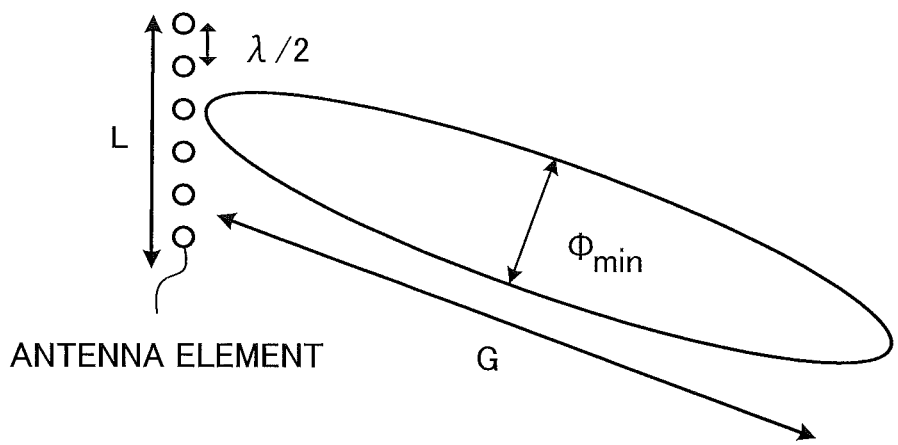
FIG. 4A shows the (one-dimensional) relationship between frequency and the number of antenna elements in the case of a frequency of 2 GHz in accordance with one or more embodiments disclosed herein.
Figure 4B:
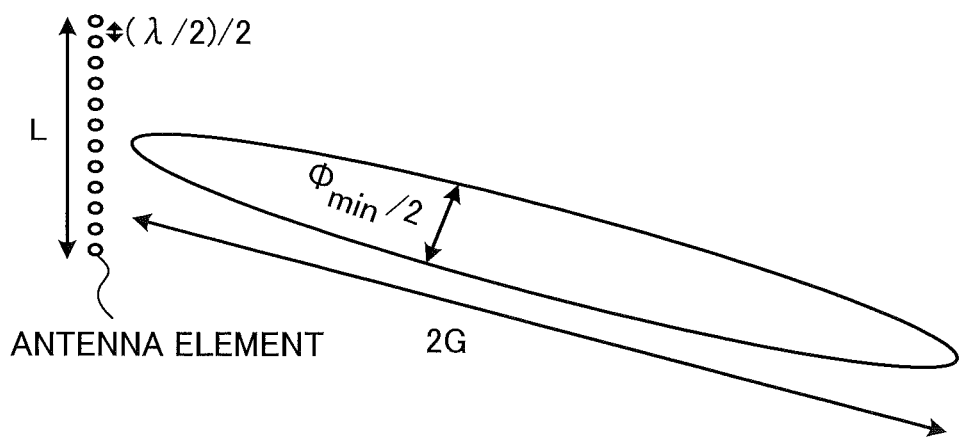
FIG. 4B shows the (one-dimensional) relationship between frequency and the number of antenna elements in the case of a frequency of 4 GHz in accordance with one or more embodiments disclosed herein.

A case will be described here with FIG. 4 where antenna elements are aligned one-dimensionally. If antenna elements are arranged one-dimensionally, the number of antenna elements Tx that can be arranged over the antenna length L increases in proportion to the rate of increase of frequency f. For example, assume that, as shown in FIG. 4A, six antenna elements are aligned over the antenna length L when frequency f is 2 GHz. In this case, as shown in FIG. 4B, when frequency f becomes 4 GHz (twice that of FIG. 4A), it becomes possible to arrange twelve (=6×2) antenna elements over the same antenna length L.

Also, when antenna elements are arranged one-dimensionally, as the number of antenna elements Tx that can be arranged over the antenna length L increases, the beamforming gain also increases. For example, as shown in FIG. 4B, the number of antenna elements Tx that can be arranged over the antenna length L becomes twice that of FIG. 4A, so that the intervals between the antenna elements (hereinafter "antenna element intervals") become ½ of FIG. 4A. When the antenna element intervals are narrower, the beam width becomes narrower, so that the beamforming gain increases. Consequently, the beamforming gain of FIG. 4B becomes twice that of FIG. 4A.

Now, by contrast, a case will be described here with FIG. 5 where antenna elements are arranged on a two-dimensional plane (when massive MIMO is applied). When antenna elements are arranged two-dimensionally, the number of antenna elements Tx that can be arranged in a predetermined area increases in square proportion to the rate of increase of frequency f. For example, assume that, as shown in FIG. 5, one antenna element is arranged on a predetermined two-dimensional plane when frequency f is 2.5 GHz. In this case, when frequency f becomes 3.5 GHz, which is 1.4 times 2.5 GHz, the number of antenna elements Tx becomes $1.4^2=1.96\sim2$. Also, when frequency f becomes 5 GHz, which is twice 2.5 GHz, the number of antenna elements Tx becomes $2^2=4$. When frequency f becomes 10 GHz, which is four times 2.5 GHz, or becomes 20 GHz, which is eight times 2.5 GHz, the number of antenna elements Tx becomes $4^2=16$ or $8^2=64$.

Also, when antenna elements are arranged two-dimensionally, as the number of antenna elements Tx that can be arranged in a predetermined area increases, the beamforming gain also increases, as shown in FIG. 5. That is, when massive MIMO is employed, the higher frequency f, the greater the beamforming gain that can be achieved. Consequently, when massive MIMO is employed in the small cells, it is possible to compensate for the path loss of the high frequency band by means of the beamforming gain.

Figure 6:
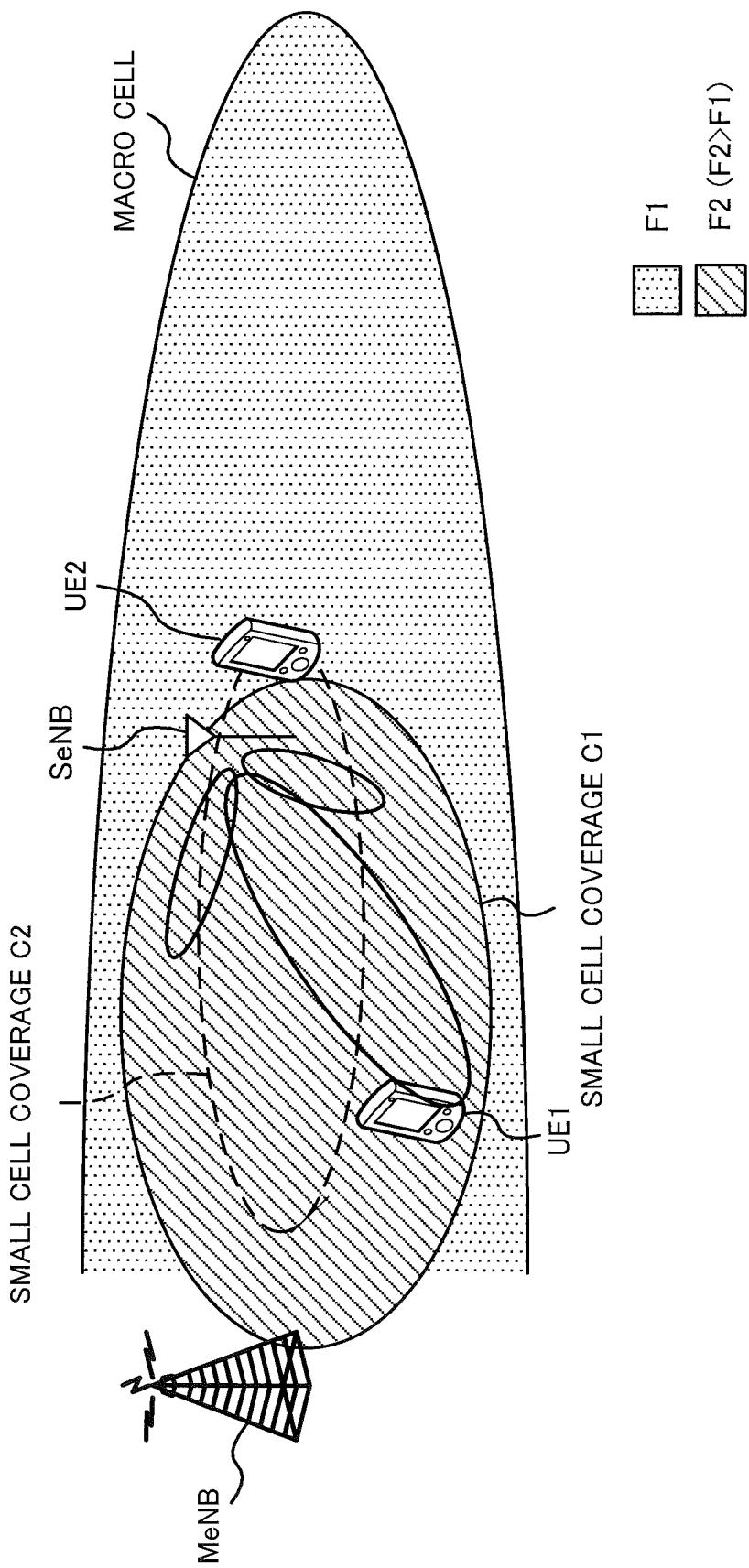
FIG. 6 is a diagram to explain small cell coverages.

FIG. 6 is a diagram to explain small cell coverages. As shown in FIG. 6, the coverage C1 of reference signals that are subject to beamforming expands in a predetermined direction, as seen in comparison with the coverage C2 of reference signals that are not subject to beamforming. By this means, a user terminal UE 1 that is located in the beamforming direction can receive the reference signals that are subject to beamforming, in desired received quality, even outside the coverage C2. On the other hand, there is a threat that a user terminal 2, which is located in the opposite direction from the beamforming direction, cannot receive the reference signals in sufficient received quality, even inside the coverage C2.

Also, in order to execute beamforming, it is necessary to acquire feedback information from user terminals such as CSI (Channel State Information) to represent channel states, AOA (Angle of Arrival) and AOD (Angle of Departure), which are used to assign weights to the antenna elements, and so on. Consequently, it may occur that beamforming cannot be executed in periods in which the feedback information, AOA, AOD and so on are not known, and the user terminals cannot receive the reference signals transmitted in these periods in sufficient received quality.

So, a method for improving the received quality of reference signals in user terminals, without executing beamforming by means of massive MIMO and so on, is under study. To be more specific, as shown in FIG. 7, a study is in progress to make the transmission bandwidth narrower and the transmission power greater in reference signal transmission periods in which beamforming is not executed, than in data transmission periods in which beamforming is executed.

Figure 7:
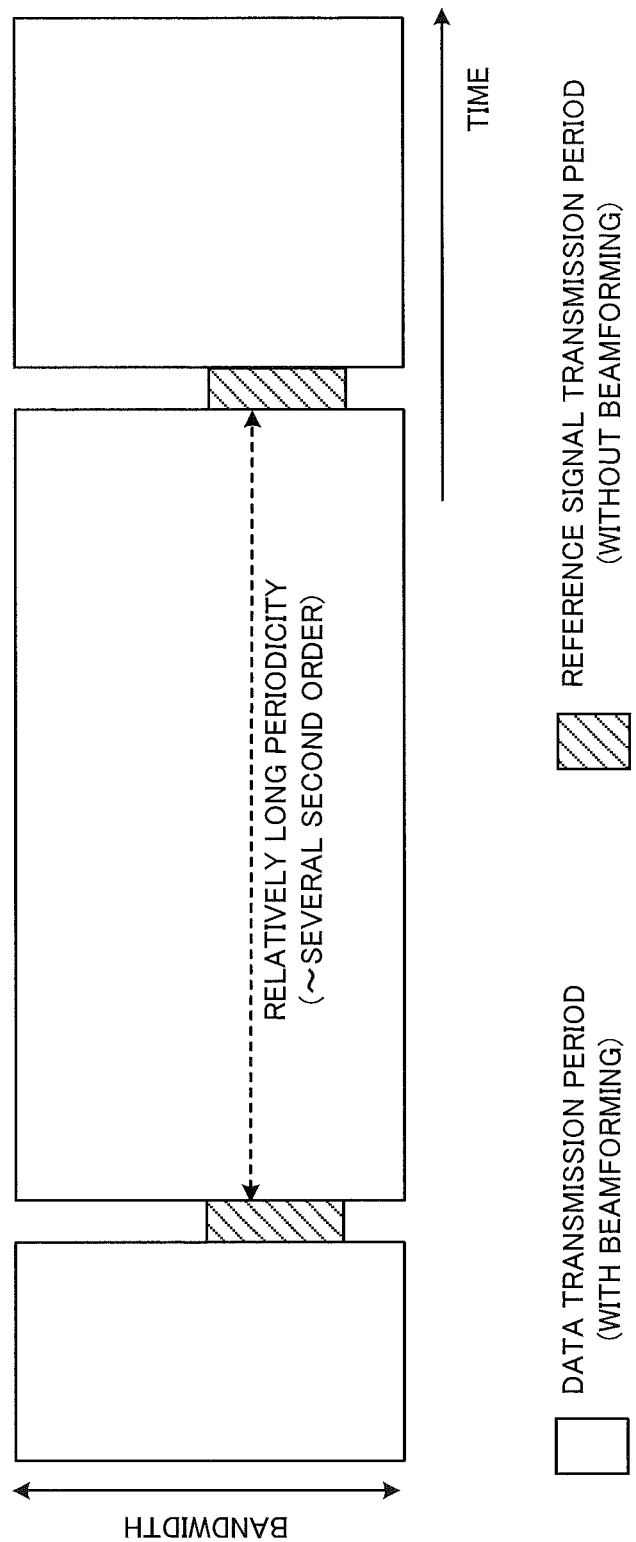
FIG. 7 is a diagram to explain reference signal transmission periods.

For example, referring to FIG. 7, in reference signal transmission periods, the transmission bandwidth is narrowed and the transmission power is increased in proportion to the beamforming gain in data transmission periods. By this means, even in small cells where the carrier F2 of the high frequency band is used, it is possible to expand the coverage of reference signals and improve the received quality of reference signals in user terminals, without executing beamforming.

However, since, as shown in FIG. 7, beamforming is not executed in reference signal transmission periods in which the transmission bandwidth is narrowed and the transmission power is increased, there is a threat that, when neighboring small cells transmit reference signals in the same frequency band, interference is produced between the small cells, the received quality of the reference signals in user terminals decreases.

So, the present inventors have worked on a radio communication method which can reduce the interference between small cells in reference signal transmission periods where the transmission power is increased, and arrived at the present invention.

With the radio communication method according to the present invention, in reference signal transmission periods (first transmission periods) in which beamforming is not executed, small base stations transmit reference signals with a narrower transmission bandwidth and greater transmission power than in data transmission periods (second transmission periods) where beamforming is executed. Also, the small base stations allocate these reference signals to bands that are associated with small base station-specific information.

Here, a reference signal transmission period (first transmission period) refers to a period to transmit reference signals without executing beamforming. Also, a reference signal is a signal for measuring received quality, and, with the present embodiment, refers to a discovery signal (DS), which a user terminal uses to measure/detect small base stations. However, other signals for received quality measurements, such as, for example, the CRS (Cell-Specific Reference Signal), the CSI-RS (Channel State Information-Reference Signal), the DM-RS (DeModulation-Reference Signal), the PRS (Positioning Reference Signal) and so on may be used as reference signals as well. Note that received quality may include, for example, the RSRP (Reference Signal Received Power), the RSRQ (Reference Signal Received Quality), the SINR (Signal to Interference plus Noise Ratio) and so on.

Figure 8:
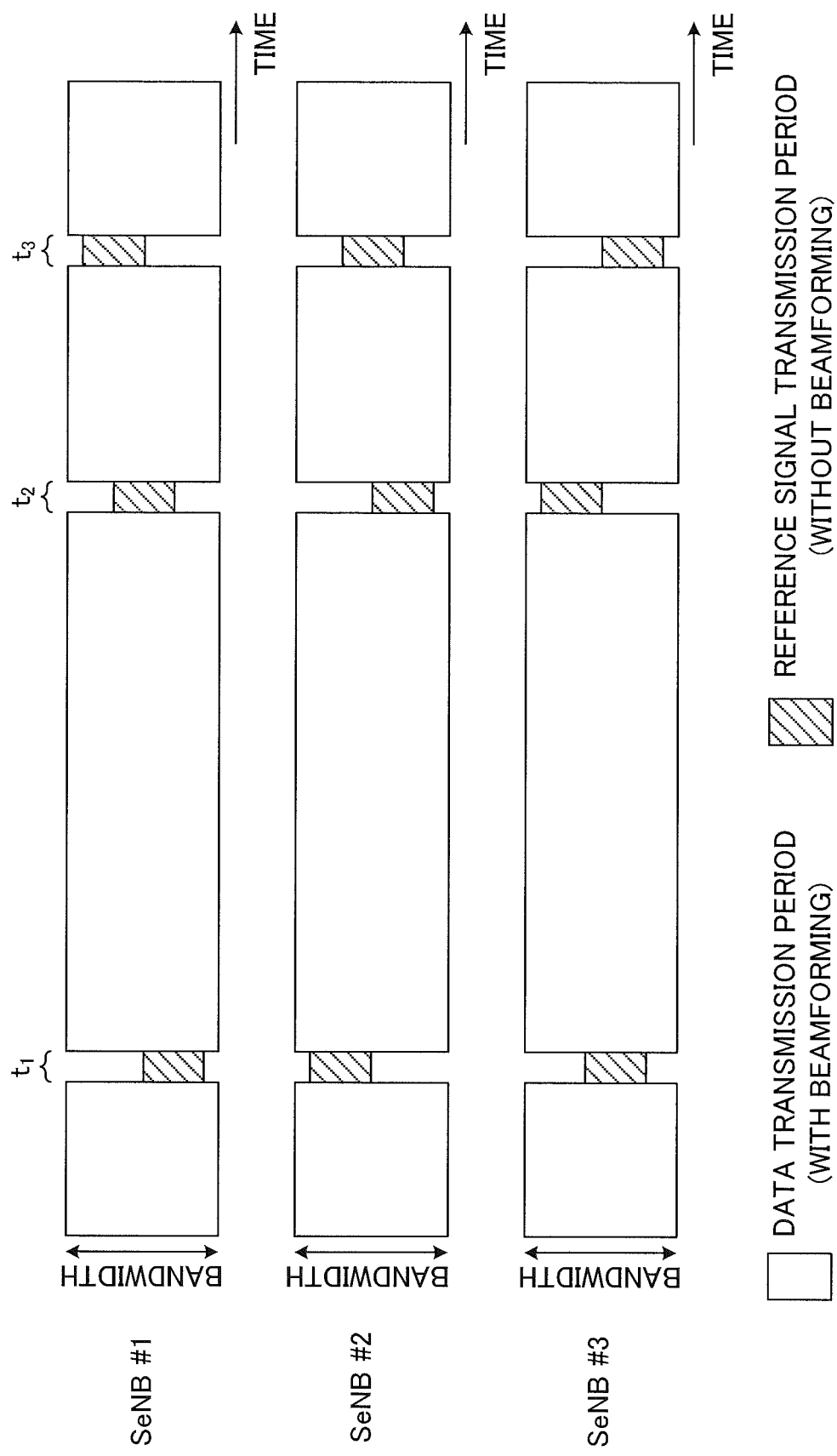
FIG. 8 is a diagram to explain a radio communication method according to example 1.1 of the present embodiment.

Also, in reference signal transmission periods, as shown in following FIG. 8 and others, reference signals are transmitted by making the transmission bandwidth narrower and the transmission power higher than in data transmission periods (second transmission periods). Consequently, even though beamforming gain cannot be achieved as in data transmission periods, it is still possible to prevent the decrease of the received quality of reference signals in user terminals. Note that the transmission bandwidth of reference signal transmission periods may be determined on the basis of the beamforming gain in data transmission periods, the number of antenna elements and soon.

On the other hand, a data transmission period (second transmission period) is a period to execute beamforming and transmit data signals (for example, user data and higher layer control information to be transmitted in the PDSCH (Physical Downlink Shared Channel). In data transmission periods, the decrease of received quality in user terminal can be prevented by virtue of beamforming gain.

Note that, in reference signal transmission periods, not only reference signals, but also non-user-specific downlink signals such as downlink system information and control signals (for example, the BCCH (Broadcast Control Channel), synchronization signals to use in cell search, common control information that is transmitted in the PDCCH (Physical Downlink Control Channel), etc.) may be transmitted. That is, the radio communication method according to the present embodiment covers both a reference signals transmission method and a control signal transmission method. Also, in data transmission periods, not only data signals, but also user-specific downlink signals such as L1/L2 signals, downlink control signals (for example, dedicated control information that is transmitted in the PDCCH) may be transmitted as well.

The present embodiment can be roughly divided into two—namely the distributed control by small base stations (examples 1 to 3) and the centralized control by a macro base station (example 4). In the distributed control, small base stations autonomously execute control pertaining to reference signal transmission on the basis of bands that are associated with small base station-specific information, so that very little communication overhead is required in this control between the macro base station and the small base stations. On the other hand, in the centralized control, the macro base station reports the bands to allocate to the small base stations, so that, although the volume of communication that is required for this control increases compared to the distributed control, it is still possible to reduce interference effectively.

Now, the radio communication method according to each example of the present embodiment will be described in detail below. Amongst the drawings to which reference will be made in the following description, FIGS. 8 to 12 and FIG. 14 show the frequency bands to allocate to base stations (SeNBs or small base stations) #1 to #3 that form small cells, for communication with user terminals in reference signal transmission periods (first transmission periods) and data transmission periods (second transmission periods). Also, FIGS. 8 to 12 and FIG. 14 show three periods t1, t2 and t3 as reference signal transmission periods. Note that SeNBs

1 to #3 use the same frequency bands, and the respective coverages of the reference signal transmission periods have common parts. Note that, according to the present embodiment, in reference signal transmission periods in which beamforming is not executed, reference signals are transmitted by narrowing the transmission bandwidth and increasing the transmission power in accordance with the beamforming gain of data transmission periods in which beamforming is executed.

Example 1

The radio communication method according to example 1 of the present embodiment will be described with reference to FIGS. 8 to 10. With the radio communication method according to example 1, each small base station transmits reference signals by applying frequency hopping on the basis of predetermined hopping patterns. Here, the reference signals may be allocated to a single band, which varies per first transmission period (example 1.1), or may be divided between and allocated to a plurality bands, which vary per first transmission period (example 1.2). Also, the reference signals may be allocated to bands that vary per predetermined time within a first transmission period (example 1.3).

FIG. 8 is a diagram to explain the radio communication method according to example 1.1. In example 1.1, each small base station allocates reference signals to a single band on the basis of hopping patterns, and transmits reference signals. Also, the allocation of bands changes per reference signal transmission period. For example, in FIG. 8, the frequency band in which SeNB #1 transmits reference signals varies among periods t1, t2 and t3.

Here, the hopping patterns have no particular limit. For example, the number of patterns may be limited to a predetermined number. However, it is preferable if the hopping patterns are configured so that reference signals are allocated to different bands at least between neighboring small base stations. Also, although FIG. 8 shows an example case in which the bandwidth allocated to reference signals is fixed between the times illustrated, the bandwidth for reference signals may be configured to change dynamically. For example, the bandwidth of reference signals may be changed in accordance with hopping patterns, or may be changed on the basis of some kind of random number sequence.

Figure 9:
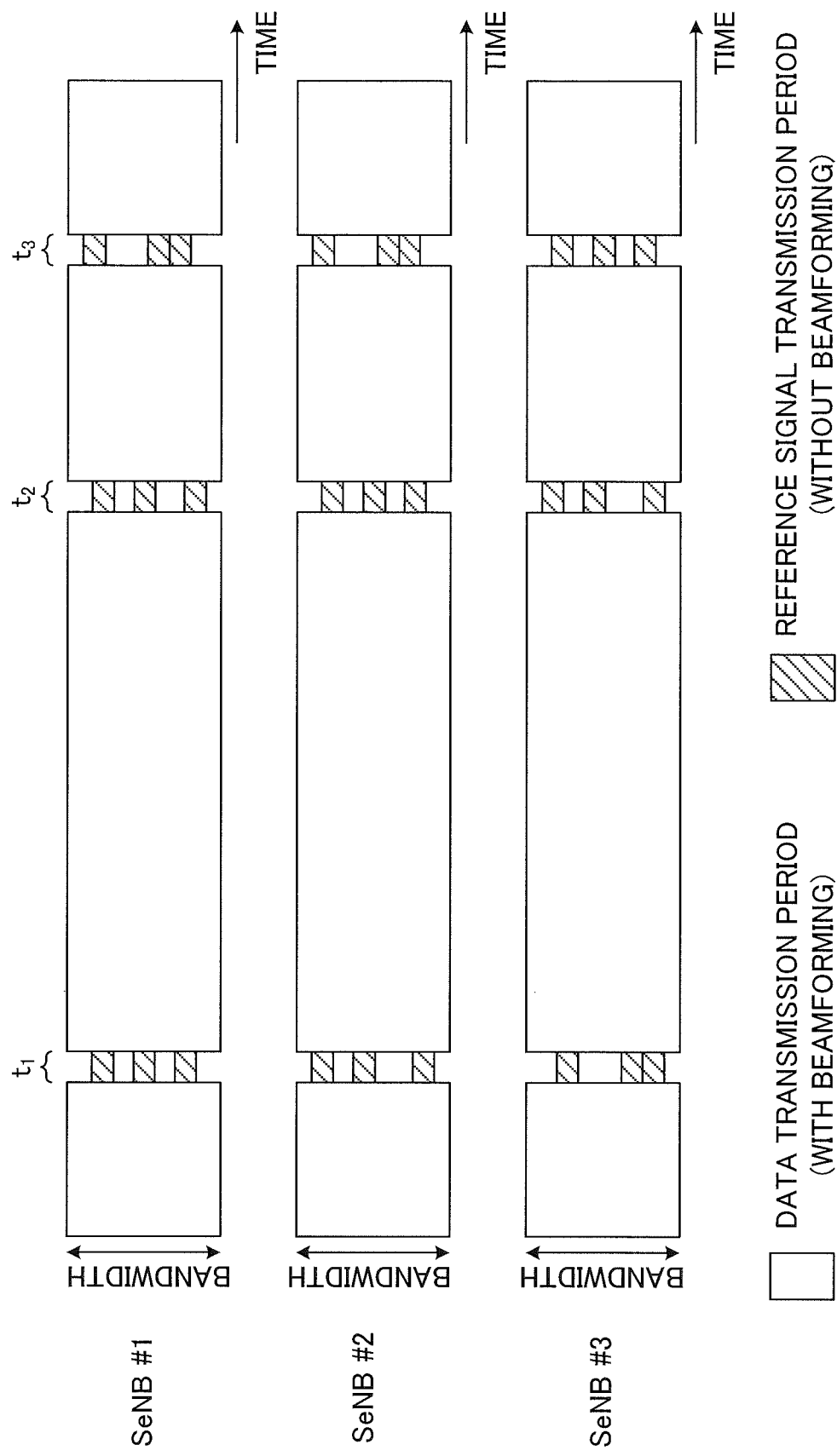
FIG. 9 is a diagram to explain a radio communication method according to example 1.2 of the present embodiment.

FIG. 9 is a diagram to explain the radio communication method according to example 1.2. In example 1.2, in each small base station, reference signals are divided between and allocated to a plurality bands, and transmitted. Also, the allocation of bands changes on a per reference signal transmission period basis.

Figure 10:
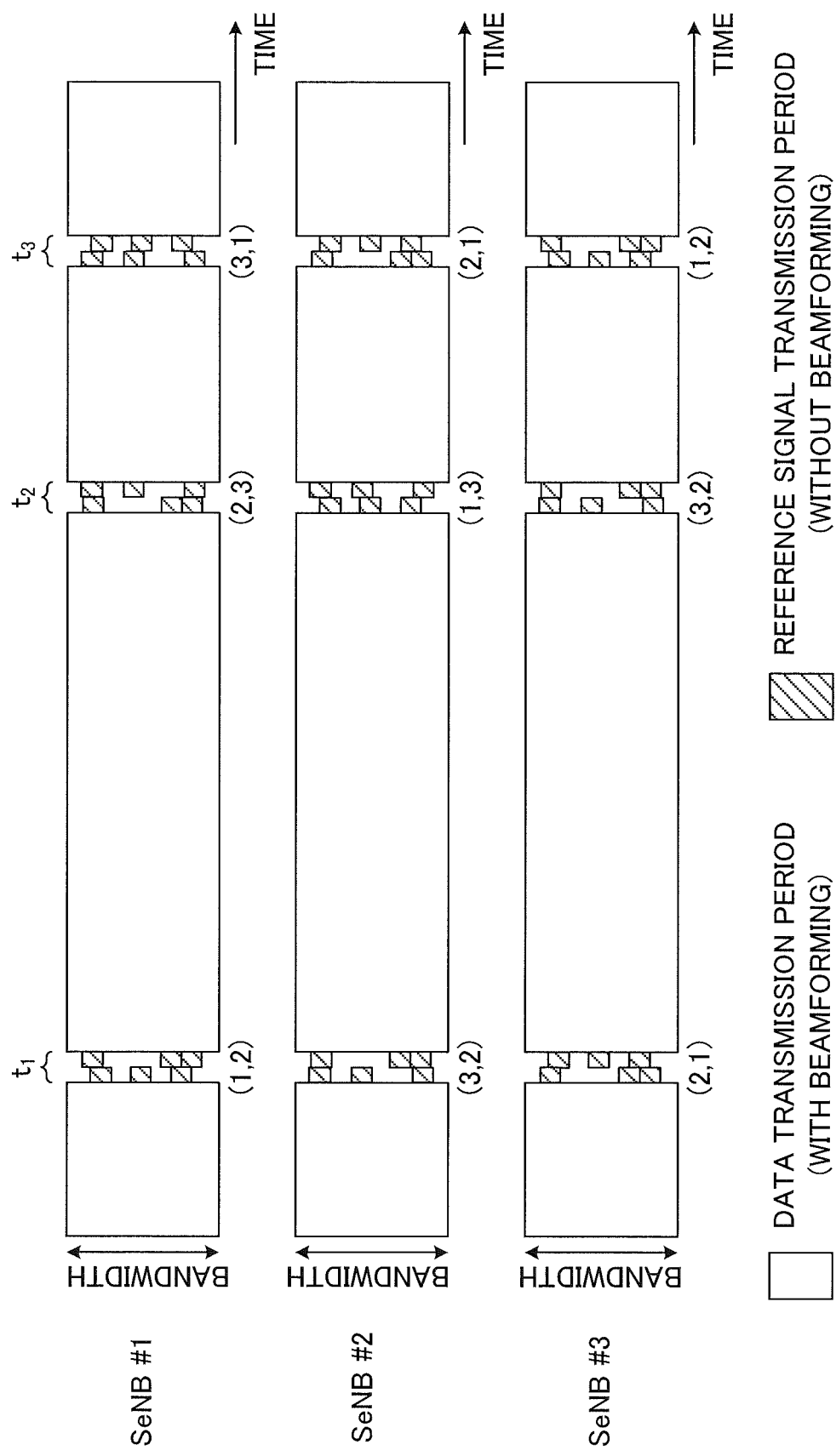
FIG. 10 is a diagram to explain a radio communication method according to example 1.3 of the present embodiment.

FIG. 10 is a diagram to explain the radio communication method according to example 1.3. In example 1.3, the difference from examples 1.1 and 1.2 is that the allocation of bands changes within one reference signal transmission period. For example, as shown in FIG. 10, one reference signal transmission period is divided into two, and different patterns of bands are allocated to these two periods. Assuming that three patterns 1, 2 and 3 are defined as hopping patterns, there are six ways of allocating patterns to these two periods. With the radio communication method according to example 1.3, even when there are periods in which reference signals are allocated to the same band between a plurality SeNBs, it is possible to reduce interference effectively by making these periods short.

Here, the predetermined hopping patterns according to example 1 and the predetermined spreading code sequences according to example 2, which will be described later, are associated with unique information in each small base station and generated in the form of random number sequences. That is, small base station-specific information is used as values to initialize random numbers (seed values, random number seeds, etc.), Consequently, the bands where reference signals are allocated are associated with small base station-specific information. Note that, in order to prevent a plurality small cells from selecting the same hopping pattern and spreading code sequence, it is preferable to make the cycle of the random number sequences (including pseudo random number sequences) long and provide each small base station with a different random number seed. With the present embodiment, the cell IDs of small cells are used as small base station-specific information. Still, the random number seeds are by no means limited to these, and may be determined from, for example, geographic locations. Also, information related to random number seeds may be reported from the MeNB.

Also, in the radio communication method according to example 1, a user terminal, after having received and de-spread reference signals that have been frequency-hopped in a small base station on the basis of a predetermined hopping pattern, measures the received quality of the reference signals.

The user terminal feeds back the measurement result of the received quality of the reference signals to the small base station. Here, the user terminal may send the feedback directly to the small base station by using a frequency band that may be used in the small cell (for example, a relatively high frequency band referred to as a "capacity carrier"), or may send the feedback to the macro base station by using a different frequency band such as a frequency band that may be used in the macro cell (for example, a relatively low frequency band referred to as a "coverage carrier"), and report the above measurement result to the small base station via the macro base station. Note that the measurement result can be fed back likewise in other examples of the present embodiment.

As described above, with the radio communication method according to example 1, small base stations apply frequency hopping to reference signals on the basis of predetermined hopping patterns and transmit the reference signals. Consequently, even when beamforming is not applied to reference signals, it is still possible to expand the coverage of the reference signals, and, furthermore, reduce the interference between the small cells, and improve the received quality of the reference signals in user terminals.

Example 2

The radio communication method according to example 2 of the present embodiment will be described with reference to FIGS. 11 and 12. With the radio communication method according to example 2, small base stations transmit reference signals by applying direct spectrum spreading based on predetermined spreading code sequences. Here, the spreading code sequences may be determined on a fixed basis (example 2.1), or may be changed per reference signal transmission period (example 2.2).

Figure 11:
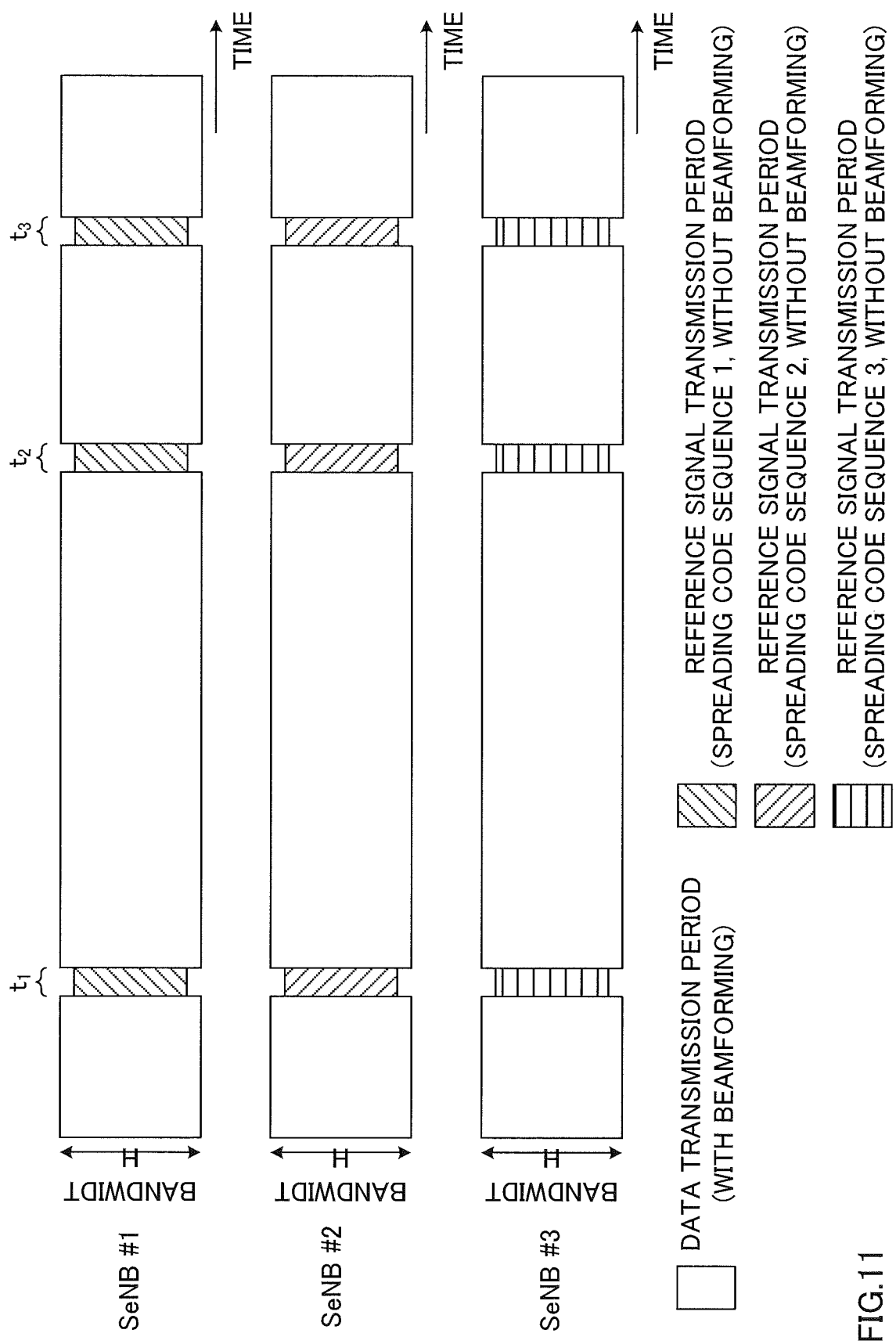
FIG. 11 is a diagram to explain a radio communication method according to example 2.1 of the present embodiment.

FIG. 11 is a diagram to explain the radio communication method according to example 2.1. In example 2.1, each small base station spreads and transmits reference signals base on a spreading code sequence that is determined on a fixed basis. FIG. 11 shows an example in which SeNBs #1 to #3 spread and transmit reference signals by using mutually varying spreading code sequences 1 to 3. In this way, it is preferable if the spreading code sequences in the small base stations vary between small base stations where the coverage of reference signals overlaps at least in part in reference signal transmission periods.

Figure 12:
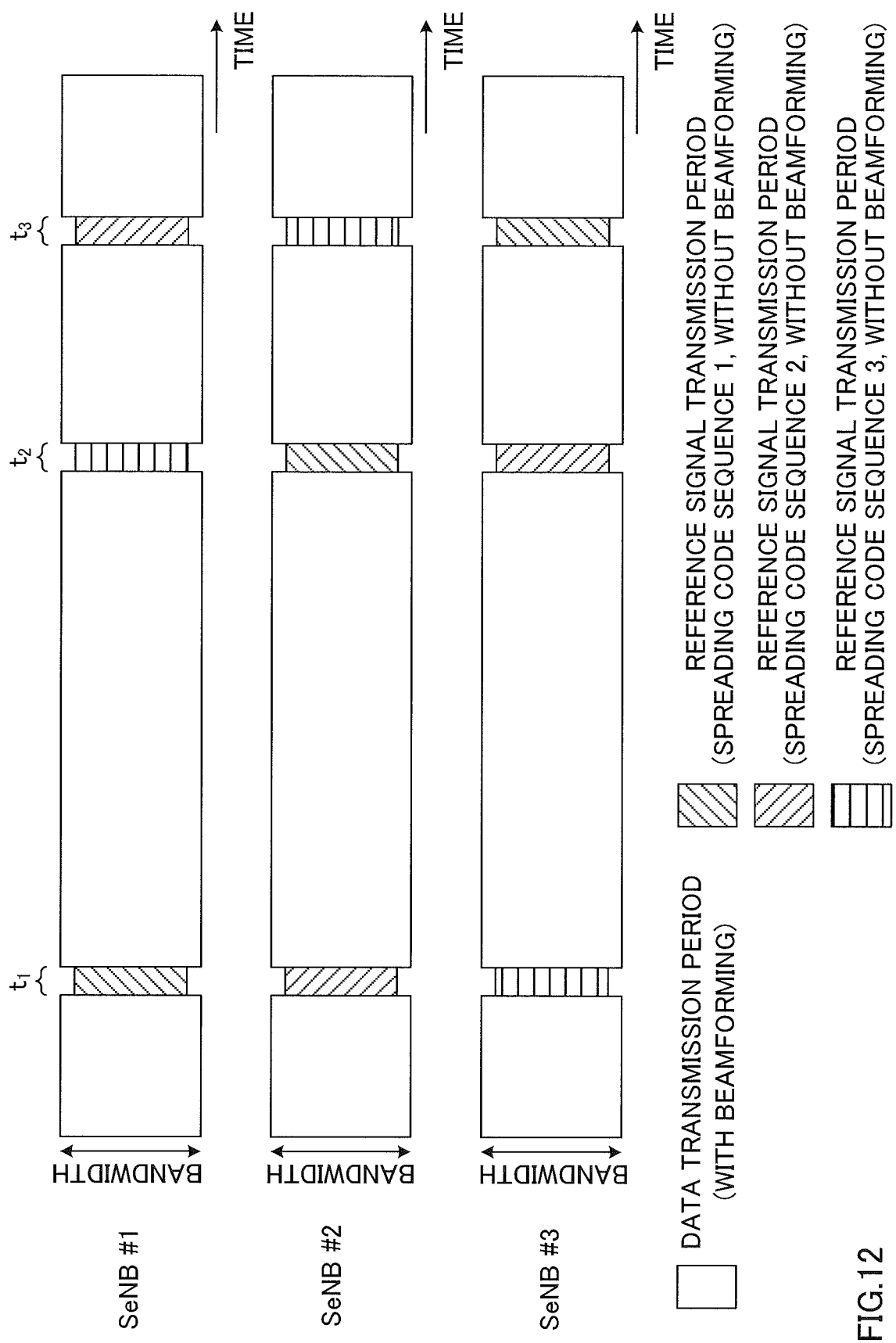
FIG. 12 is a diagram to explain a radio communication method according to example 2.2 of the present embodiment.

FIG. 12 is a diagram to explain the radio communication method according to example 2.2. In example 2.2, each small base station spreads and transmits reference signals with spreading code sequences that vary per reference signal transmission period. With the radio communication method according to example 2.2, it is possible to prevent a plurality small base stations from using the same spreading code sequence for a long time, so that it is possible to reduce interference more effectively than in example 2.1. For example, it is possible to prevent the situation where SeNBs #1 and #2 both carry out spreading using spreading code sequence 1 in all of periods t1 to t3.

Also, in the radio communication method according to example 2, a user terminal, after having received and de-spread reference signals that have been spread in a small base station on the basis of a predetermined spreading code sequence, measures the received quality of the reference signals.

As described above, with the radio communication method according to example 2, small base stations apply direct spectrum spreading to reference signals based on predetermined spreading code sequences and transmit the reference signals. Consequently, even when beamforming is not applied to reference signals, it is still possible to expand the coverage of the reference signals, and, furthermore, reduce the interference between the small cells, and improve the received quality of the reference signals in user terminals.

Figure 13:
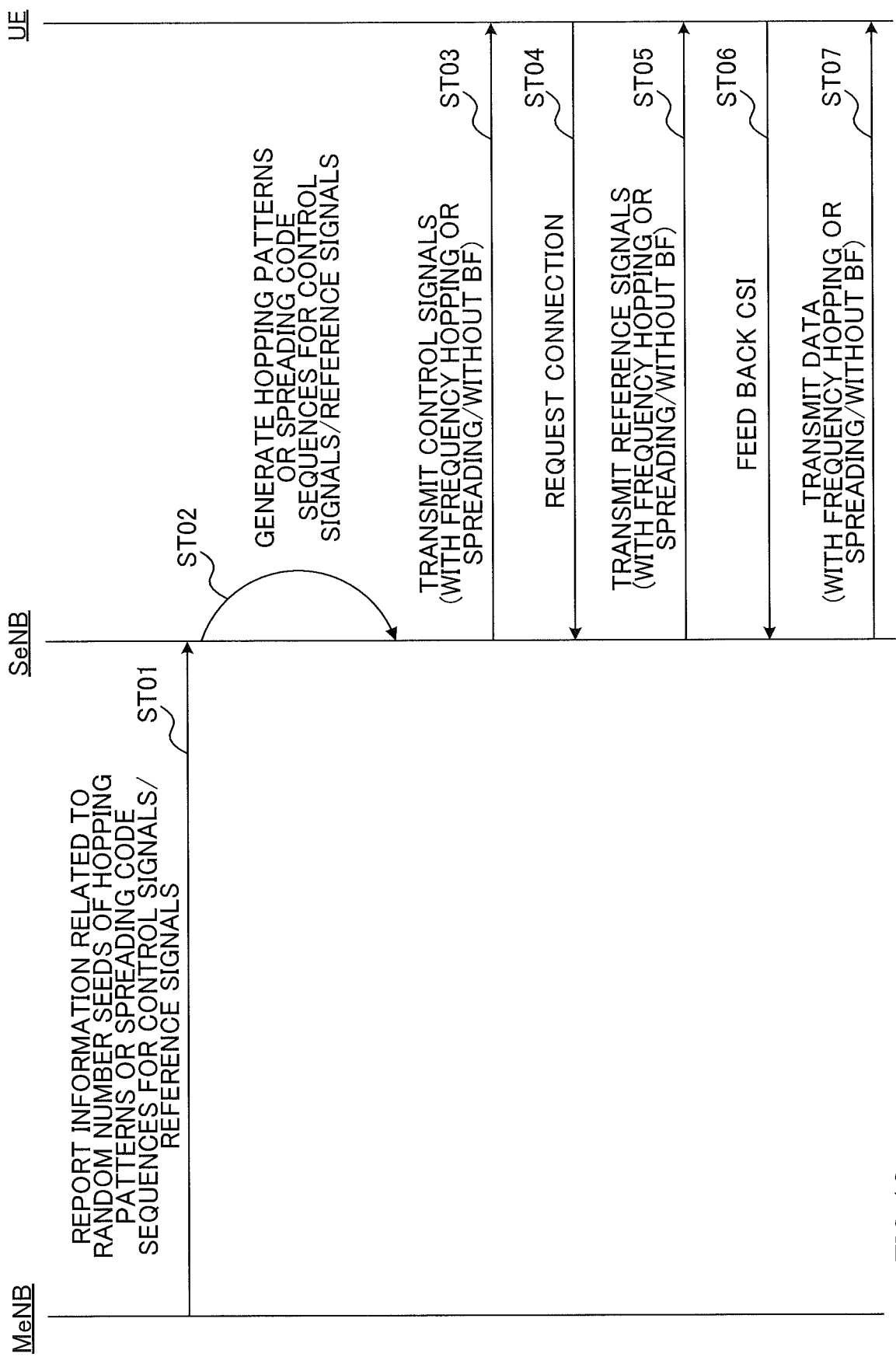
FIG. 13 is a sequence diagram of the radio communication methods according to examples 1 and 2 of the present embodiment.

FIG. 13 shows a sequence diagram of the radio communication methods according to examples 1 and 2.

First, the MeNB reports information related to the random number seeds of the hopping patterns or spreading code sequences for control signals/reference signals, to an SeNB that forms a geographically-overlapping small cell (step ST01). Also, information other than the information related to random number seeds may be reported as well. For example, it is equally possible to report information related to the bands to transmit reference signals, and change the bands to hop in accordance with this piece of information. Note that when the SeNBs does not require the information from the MeNB to generate the hopping pattern and spreading code sequence to use (for example, when using the cell ID of its own cell as a random number seed), step ST01 may be omitted.

Next, the SeNB generates the hopping pattern or spreading code sequence for control signals/reference signals on the basis of the information reported (step ST02). Note that, if the hopping patterns or spreading code sequences that have been generated earlier are retained in the SeNB and these hopping patterns or spreading code sequences can be used, step ST02 needs not be carried out.

Next, the SeNB applies frequency hopping or spreading to a UE serving thereunder, on the basis of the hopping pattern or spreading code sequence generated, and transmits control signals (for example, synchronization signals such as the PSS (Primary Synchronization Signal) and the SSS (Secondary Synchronization Signal)) (step ST03). Like reference signals, beamforming (BF) is not applied to the control signals.

Next, the UE having received the control signals transmit a connection request to the SeNB (step ST04).

Next, the SeNB, upon receiving the connection request from the UE, transmits reference signals by applying frequency hopping or spreading, like the above control signals (step ST05). Also, the SeNB may transmit control signals (for example, system information blocks (SIBs)) as appropriate. Note that, when information related to random number seeds is reported again from the MeNB between the transmission of control signals in step ST03 and the transmission of reference signals in step ST05, it is possible to execute step ST02 again and apply the hopping pattern or spreading code sequence that is generated, to step ST05.

Next, the UE performs channel estimation from the reference signals received, and feeds back CSI (step ST06).

Using the CSI that is fed back, the SeNB adjusts antennas and so on as appropriate, and transmits data (step ST07). Beamforming (BF) is carried out upon data transmission.

Example 3

The radio communication method according to example 3 of the present embodiment will be described with reference to FIG. 14. With the radio communication method according to example 3, small base stations allocate reference signals to bands that are associated with small base station-specific information on a fixed basis, and transmit the reference signals. At this time, it is preferable to associate bands so that varying bands are allocated at least between neighboring small base stations. With the present embodiment, as noted earlier, the cell IDs of small cells are used as small base station-specific information. However, the small base station-specific information is by no means limited to this, and may be determined, for example, from geographic locations.

Figure 14:
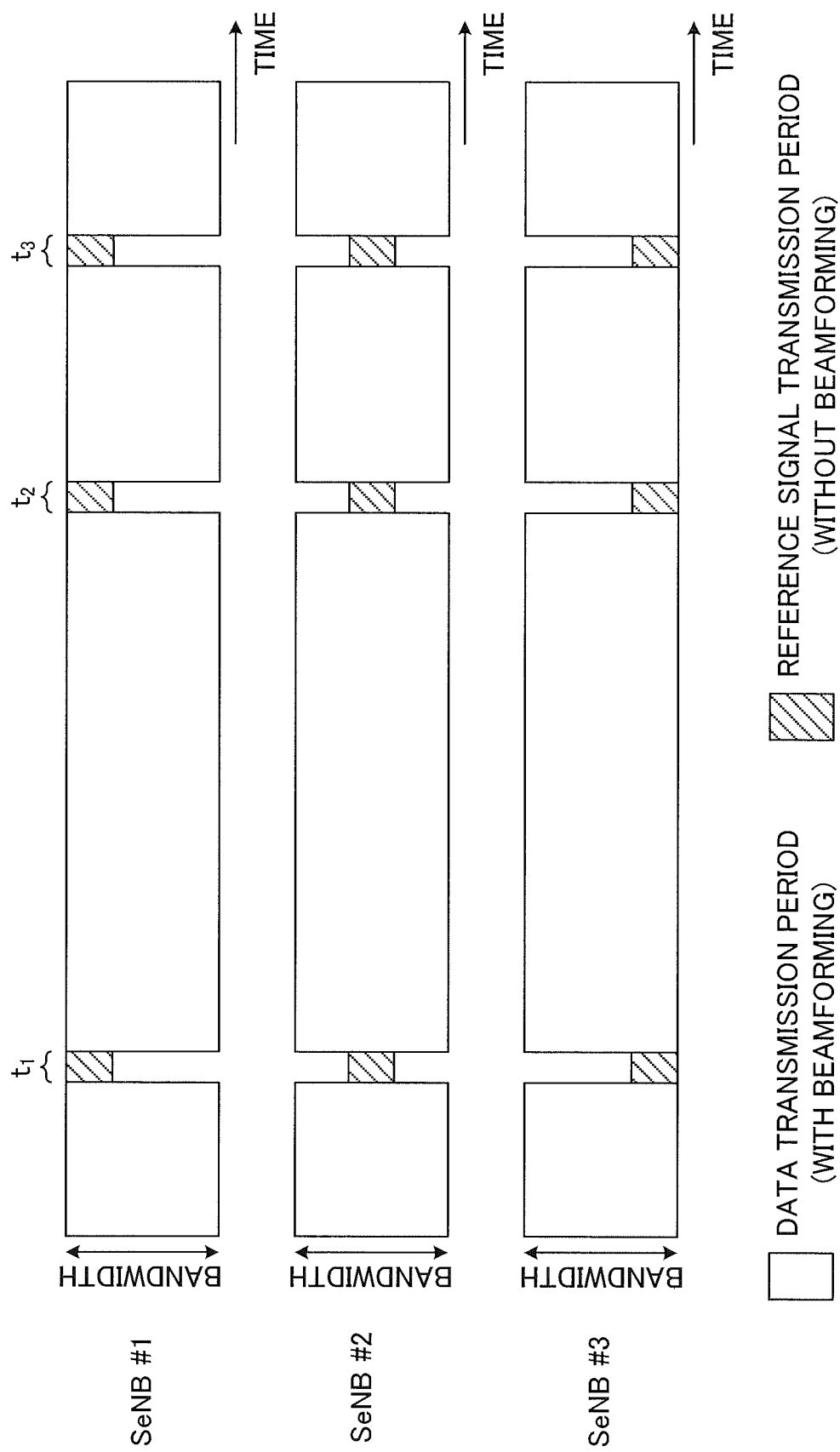
FIG. 14 is a diagram to explain radio communication methods according to examples 3 and 4 of the present embodiment.

FIG. 14 is a diagram to explain the radio communication method according to example 3. Each small base station allocates reference signals to a frequency band that is associated with information specific to the small base station (for example, the cell ID) and transmits the reference signals. That is, example 3 is different from example 1 in that bands are allocated on a fixed basis. Also, although FIG. 14 illustrates a case where reference signals are allocated to a single band, it is equally possible to employ a structure in which plurality bands are associated with a cell ID and reference signals are allocated to these multiple bands.

In the radio communication method according to example 3, a user terminal, after having received the reference signals that have been allocated to predetermined bands and transmitted from the small base stations, measures the received quality of the reference signals.

As described above, with the radio communication method according to example 3, small base stations allocate reference signals to bands that are associated with small base station-specific information, and transmit the reference signals. Consequently, even when beamforming is not applied to reference signals, it is still possible to expand the coverage of the reference signals, and, furthermore, reduce the interference between the small cells, and improve the received quality of the reference signals in user terminals.

Example 4

According to example 4 of the present embodiment, the MeNB prevents interference by controlling, in a centralized manner, the allocation of reference signal bands which each serving SeNB uses. By this means, it is possible to effectively reduce the interference between the SeNBs with example 4.

Above-described FIG. 14 is also a diagram to explain the radio communication method according to example 4. In example 4, as in example 1, each small base station allocates reference signals to a predetermined band and transmits the reference signals. Furthermore, in example 4, the band where each SeNB's reference signals are allocated is managed in the MeNB in a centralized manner, so that, by preventing each SeNB's band from overlapping one another, it is possible to prevent interference adequately. With the present embodiment, the MeNB reports the band to allocate reference signals (for example, resource blocks), to each SeNB. However, this is by no means limiting, and the MeNB may equally report information about bands, and the SeNBs may determine the bands to allocate reference signals from that piece of information.

Although FIG. 14 illustrates a case where each SeNB's band is allocated on a fixed basis, the MeNB may report bands to the SeNBs at arbitrary times and thereby change the allocation dynamically. For example, the MeNB may report the bands for allocating reference signals to SeNBs #1 and #2 after period t2 shown in FIG. 14 is over, and switch the bands which SeNBs #1 and #2 use, in period t3. Also, although FIG. 14 illustrates a case where reference signals are allocated to a single band, it is equally possible to employ a structure in which reference signals are divided between a plurality bands and allocated.

In the radio communication method according to example 3, a user terminal, after having received the reference signals that have been allocated to predetermined bands and transmitted from the small base stations, measures the received quality of the reference signals.

As described above, with the radio communication method according to example 4, small base stations allocate reference signals to bands that are reported from the macro base station, and transmit the reference signals. Consequently, even when beamforming is not applied to reference signals, it is still possible to expand the coverage of the reference signals, and, furthermore, reduce the interference between the small cells, and improve the received quality of the reference signals in user terminals.

Figure 15:
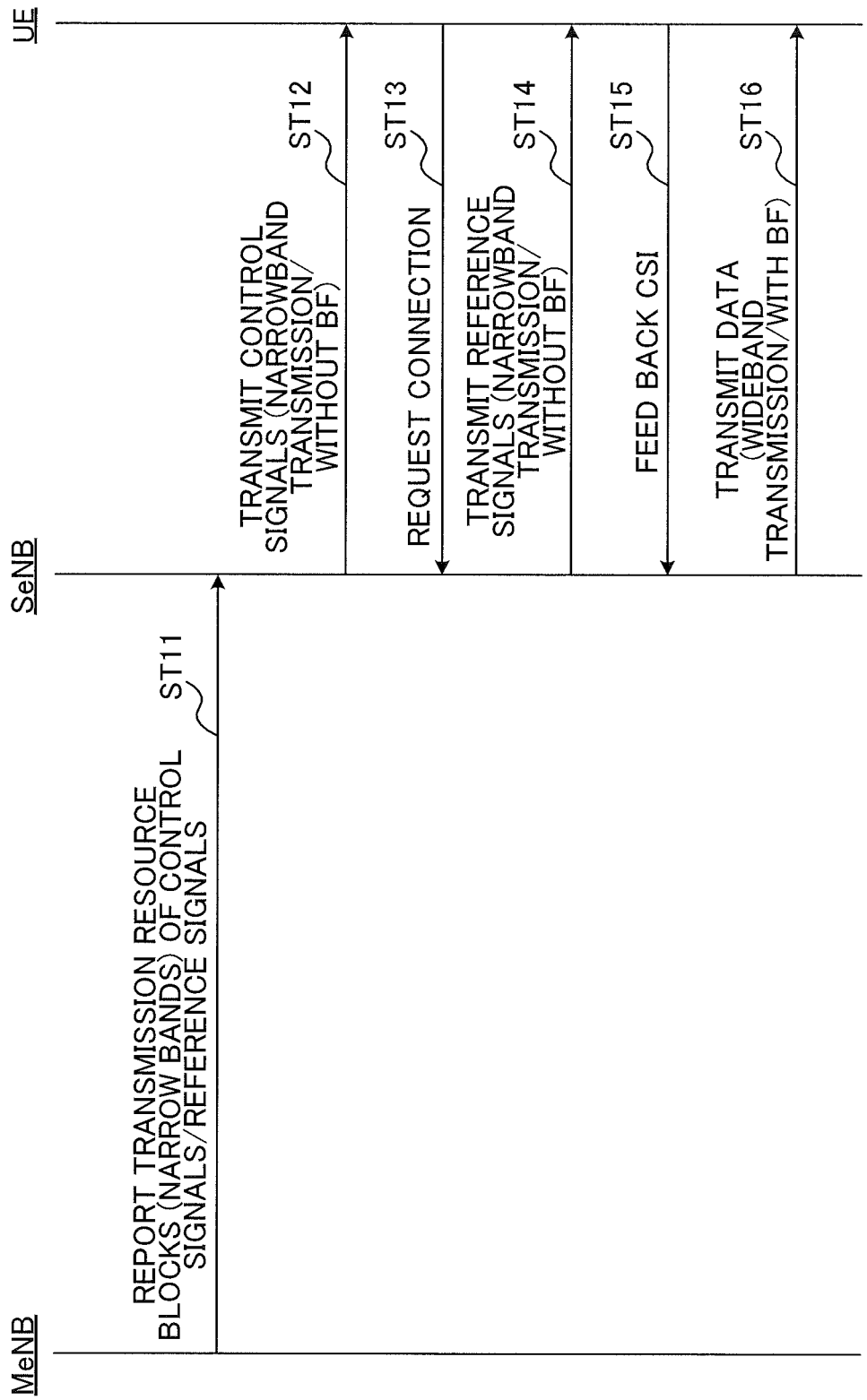
FIG. 15 is a sequence diagram of the radio communication methods according to examples 3 and 4 of the present embodiment.

FIG. 15 shows a sequence diagram of the radio communication methods according to examples 3 and 4. Step ST11 is not carried out in example 3, so that "REPORTED BAND" should read "BAND DETERMINED IN SUBJECT SMALL BASE STATION" instead. Also, steps ST13, ST15 and ST16 are the same as steps ST04, ST06 and ST07 in FIG. 13, and therefore will not be described.

First, the MeNB reports the transmission band of control signals/reference signals to an SeNB that forms a geographically-overlapping small cell (step ST11). When there are a plurality of SeNBs that interfere with each other, the band to be used in each SeNB is controlled not to overlap one another. Here, the bandwidth of the band that is reported is preferably narrower than the band which the SeNB uses in data transmission periods. As noted earlier, step ST11 is not carried out in example 3.

Next, the SeNB transmits control signals (for example, the PSS, the SSS, etc.) to a UE serving thereunder, using the reported band (step ST12). Like reference signals, beamforming (BF) is not applied to the control signals.

The SeNB, upon receiving a connection request from the UE, transmits reference signals in a narrow band, like the above-control signals (step ST14). Here, the SeNB may transmit control signals (for example, SIBs) as appropriate. Note that, when the transmission band is reported again from the MeNB between the transmission of control signals in step ST12 and the transmission of reference signals in step ST14, different bands may be used in step ST12 and in step ST14.

(Variation)

Also, examples 1 to 4 of the present embodiment can be combined as appropriate. For example, it is possible to employs a structure in which, when SeNBs #1 to #3 are controlled, the reference signals in SeNB #1 are allocated to a high frequency band based on example 4, while the reference signals in SeNB #2 and #3 are hopped to other bands apart from the high frequency band based on example 1. By this means, it is possible to execute control taking into account the trade-off between controllability and the volume of control-related communication. Also, it is equally possible to employ a structure in which the reference signals spread in example 2 are further hopped according to example 1.

(Structure of Radio Communication System)

Now, a structure of a radio communication system according to the present embodiment will be described. In this radio communication system, at least one of the above-described radio communication methods (examples 1 to 4) is employed. A schematic structure of a radio communication system according to the present embodiment will be described with reference to FIGS. 16 to 20.

Figure 16:
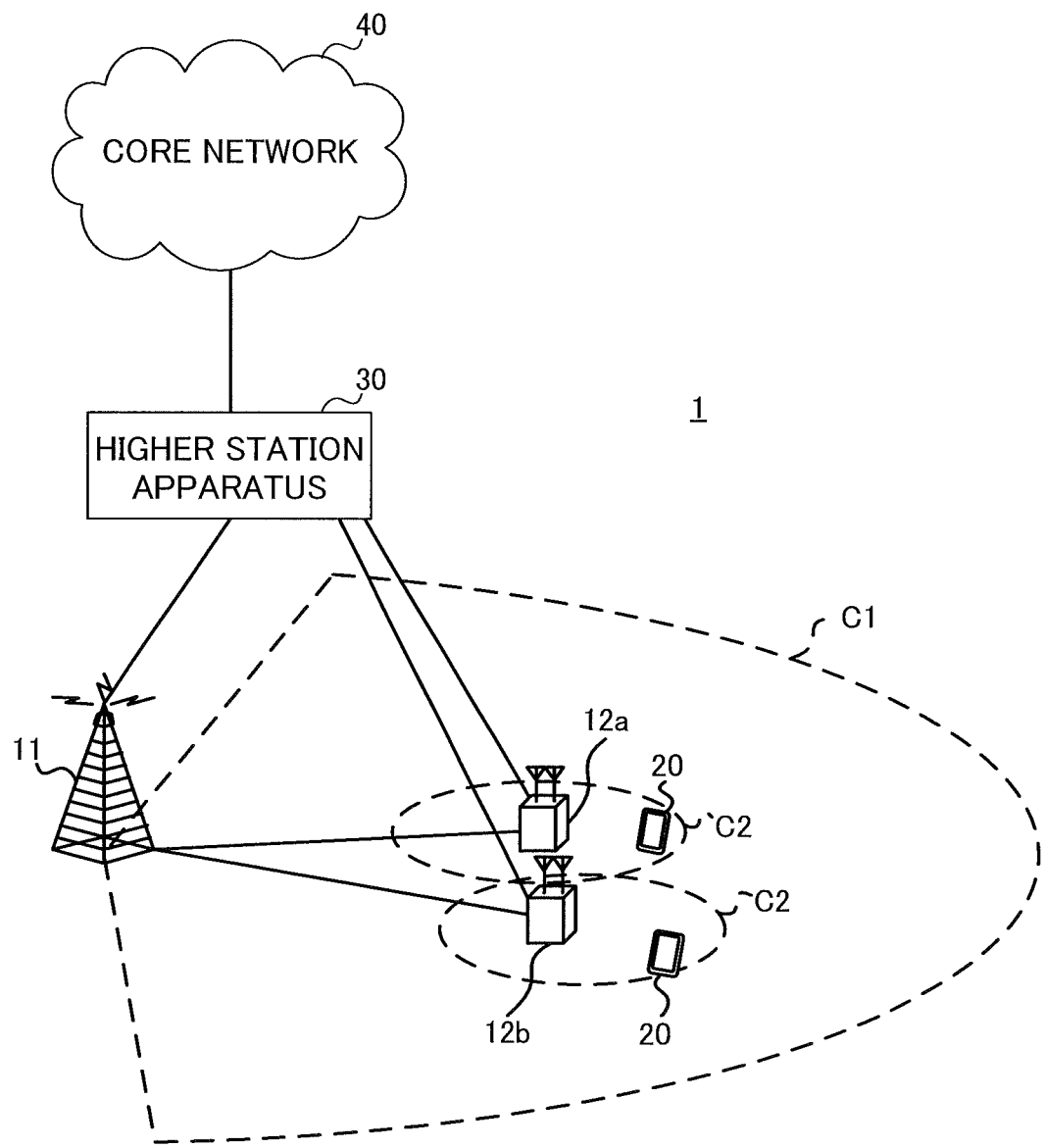
FIG. 16 is a schematic diagram to show an example of a radio communication system according to the present embodiment.

FIG. 16 is a diagram to show a schematic structure of the radio communication system according to the present embodiment. Note that the radio communication system shown in FIG. 16 is a system to incorporate, for example, the LTE system, the LTE-A system, IMT-advanced, 4G, FRA (Future Radio Access) and so on.

As shown in FIG. 16, the radio communication system 1 includes a macro base station 11, which forms a macro cell C1, and small base stations 12a and 12b, which are placed in the macro cell C1 and which form small cells C2 that are narrower than the macro cell C1. Also, user terminals 20 are placed in the macro cell C1 and in each small cell C2. The user terminals 20 are structured to be capable of carrying out radio communication with both the macro base station 11 and the small base stations 12.

In the macro cell C1, for example, a carrier F1 of a relatively low frequency band such as, for example, 800 MHz and 2 GHz, is used. Meanwhile, in the small cells C2, a carrier F2 of a relatively high frequency band such as, for example, 3.5 GHz and 10 GHz, is used. Note that the carrier F1 may be referred to as an "existing carrier," "legacy carrier," "coverage carrier" and so on. Also, the carrier F2 may be referred to as an "additional carrier," "capacity carrier" and so on. Note that carriers of the same frequency band may be used in the macro cell C1 and the small cells C2.

The macro base station 11 and each small base station 12 may be connected via cable or may be connected by radio. The macro base station 11 and the small base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these.

Note that the macro base station 11 is a radio base station having a relatively wide coverage, and may be referred to as an "eNodeB (eNB)," a "radio base station," a "transmission point" and so on. The small base stations 12 are radio base stations that have local coverages, and may be referred to as "RRHs (Remote Radio Heads)," "pico base stations," "femto base stations," "Home eNodeBs," "transmission points," "eNodeBs (eNBs)" and so on. The user terminals 20 are terminals to support various communication schemes such as LTE and LTE-A, and may not only be mobile communication terminals, but may also be fixed communication terminals as well.

Also, in the radio communication system 1, as radio access schemes, OFDMA (Orthogonal Frequency Division Multiple Access) is applied to the downlink, and SC-FDMA (Single-Carrier Frequency Division Multiple Access) is applied to the uplink.

Also, in the radio communication system 1, a downlink shared channel (PDSCH: Physical Downlink Shared Channel), which is used by each user terminal 20 on a shared basis, downlink control channels (PDCCH: Physical Downlink Control Channel, EPDCCH: Enhanced Physical Downlink Control Channel, PCFICH, PHICH, broadcast channel (PBCH), etc.), and so on are used as downlink communication channels. User data and higher layer control information are transmitted by the PDSCH. Downlink control information (DCI) is transmitted by the PDCCH and the EPDCCH.

Also, in the radio communication system 1, an uplink shared channel (PUSCH: Physical Uplink Shared Channel), which is used by each user terminal 20 on a shared basis, and an uplink control channel (PUCCH: Physical Uplink Control Channel) are used as uplink communication channels. User data and higher layer control information are transmitted by the PUSCH. Also, downlink radio quality information (CQI: Channel Quality Indicator), delivery acknowledgment information (ACKs/NACKs) and so on are transmitted by the PUCCH.

Figure 17:
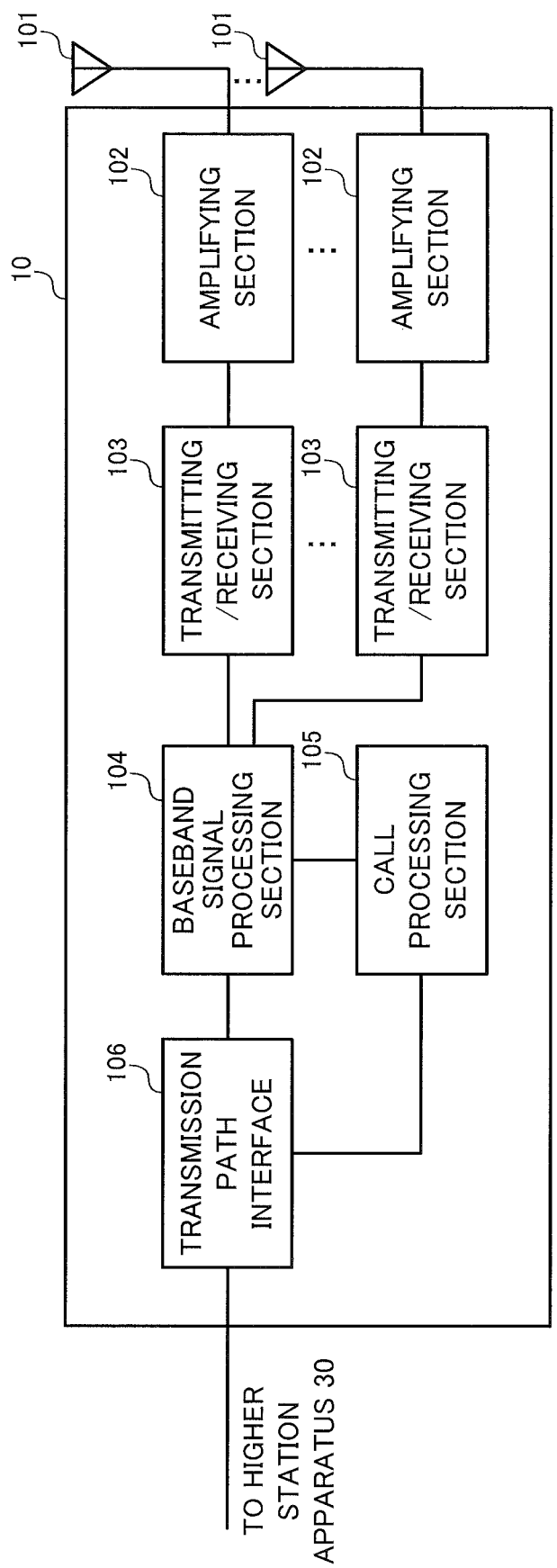
FIG. 17 is a diagram to explain an overall structure of a radio base station according to the present embodiment.

Hereinafter, the macro base station 11 and the small base stations 12 will be collectively referred to as "radio base station 10," unless distinction needs to be drawn otherwise. FIG. 17 is a diagram to show an overall structure of a radio base station 10 according to the present embodiment. The radio base station 10 has a plurality of transmitting/receiving antennas 101 (antenna ports) for MIMO transmission, amplifying sections 102, transmitting/receiving sections 103, a baseband signal processing section 104, a call processing section 105 and a transmission path interface 106. Note that a plurality of transmitting/receiving antennas 101 may be formed with antenna elements for massive MIMO.

User data to be transmitted from the radio base station 10 to a user terminal 20 on the downlink is input from the higher station apparatus 30 to the baseband signal processing section 104, via the transmission path interface 106.

In the baseband signal processing section 104, a PDCP layer process, division and coupling of the user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is transferred to each transmitting/receiving section 103. Furthermore, downlink control signals are also subjected to transmission processes such as channel coding and an inverse fast Fourier transform, and transferred to each transmitting/receiving section 103.

Each transmitting/receiving section 103 converts the downlink signals, pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

On the other hand, as for uplink signals, radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data that is included in the input uplink signals is subjected to an FFT process, an IDFT process, error correction decoding, a MAC retransmission control receiving process, and RLC layer and PDCP layer receiving processes, and transferred to the higher station apparatus 30 via the transmission path interface 106. The call processing section 105 performs call processing such as setting up and releasing communication channels, manages the state of the radio base station 10 and manages the radio resources.

Figure 18:
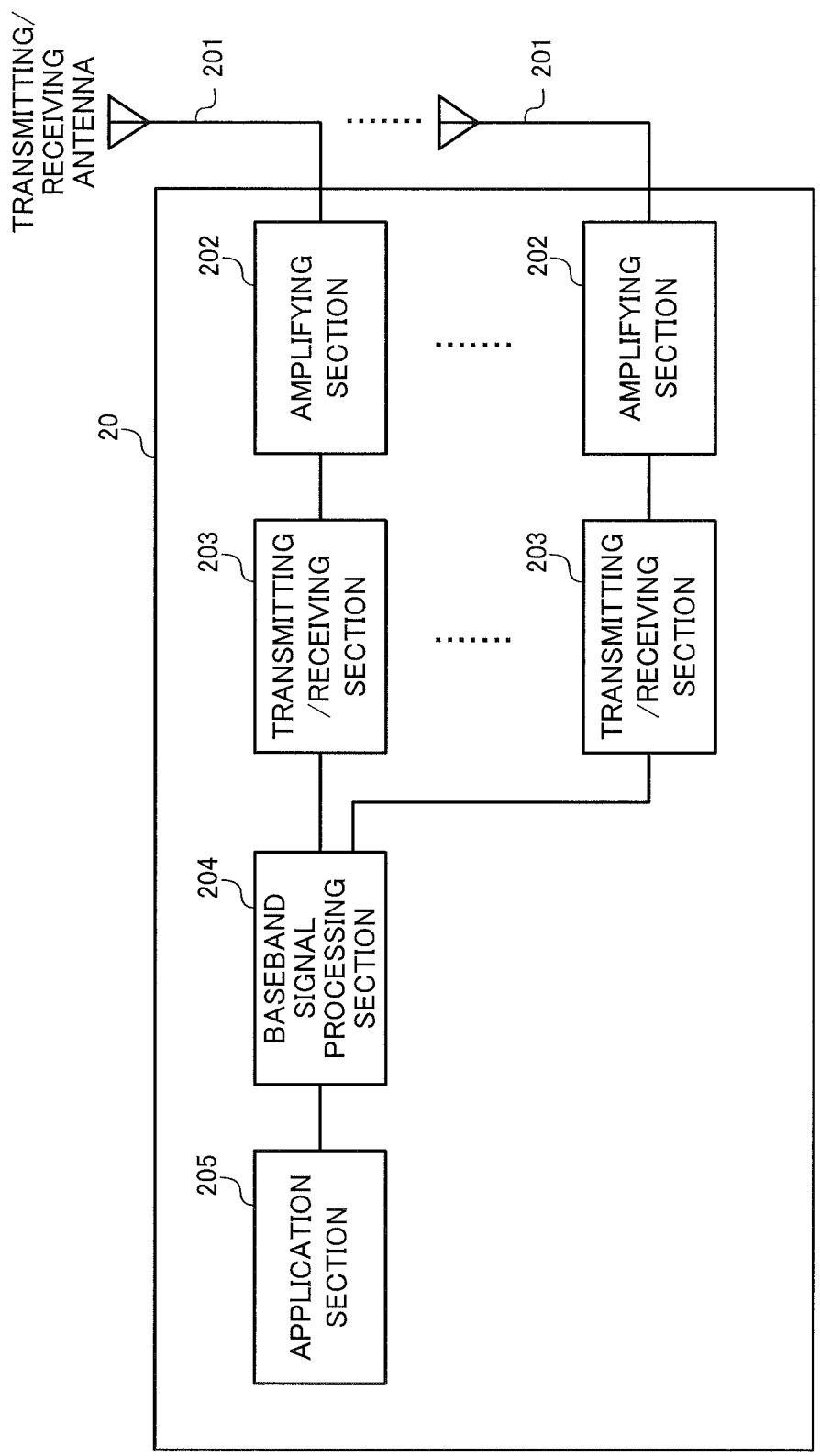
FIG. 18 is a diagram to explain an overall structure of a user terminal according to the present embodiment.

FIG. 18 is a diagram to show an overall structure of a user terminal 20 according to the present embodiment. The user terminal 20 has a plurality of transmitting/receiving antennas 201 for MIMO transmission, amplifying sections 202, transmitting/receiving sections 203, a baseband signal processing section 204 and an application section 205.

As for downlink signals, radio frequency signals that are received in a plurality of transmitting/receiving antennas 201 are each amplified in the amplifying sections 202, subjected to frequency conversion in the transmitting/receiving sections 203, and input in the baseband signal processing section 204. In the baseband signal processing section 204, an FFT process, error correction decoding, a retransmission control receiving process and so on are performed. The user data that is included in the downlink signals is transferred to the application section 205. The application section 205 performs processes related to higher layers above the physical layer and the MAC layer. The broadcast information in the downlink data is also transferred to the application section 205.

Meanwhile, uplink user data is input from the application section 205 to the baseband signal processing section 204. In the baseband signal processing section 204, a retransmission control (H-ARQ (Hybrid ARQ)) transmission process, channel coding, precoding, a DFT process, an IFFT process and so on are performed, and the result is transferred to each transmitting/receiving section 203. Baseband signals that are output from the baseband signal processing section 204 are converted into a radio frequency band in the transmitting/receiving sections 203. After that, the amplifying sections 202 amplify the radio frequency signals having been subjected to frequency conversion, and transmit the results from the transmitting/receiving antennas 201.

Figure 19:
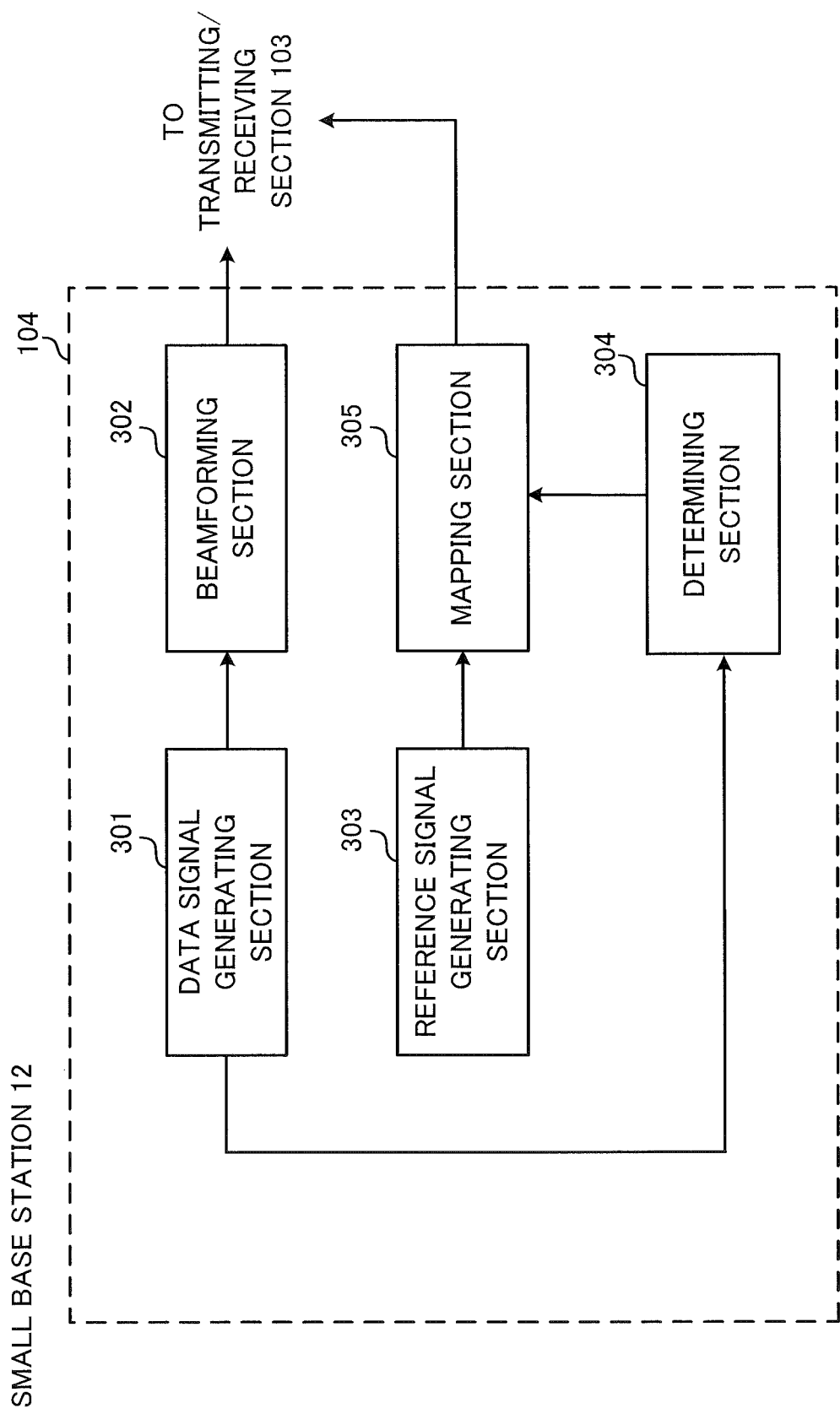
FIG. 19 is a diagram to explain a functional structure of a small base station according to the present embodiment.

FIG. 19 is a diagram to show a functional structure of a small base station 12 according to the present embodiment. Note that the following functional structure is formed with the baseband signal processing section 104 provided in the small base station 12 and so on. As shown in FIG. 19, the small base station 12 has a data signal generating section 301, a beamforming section 302, a reference signals generating section 303, a determining section 304 and a mapping section 305.

The data signal generating section 301 generates a data signal to transmit in a data transmission period (second transmission period), and outputs the data signal to the beamforming section 302. As noted earlier, the data signal includes the user data and higher layer control information and so on, to transmit in the PDSCH. The data signal output to the transmitting/receiving sections 103 is subjected to beamforming and transmitted in data transmission periods (FIG. 8).

The beamforming section 302 applies beamforming to the user terminal 20 based on feedback information (for example, CSI, AOA, AOD, etc.) from the user terminal 20. To be more specific, the beamforming section 302 assigns a weight to the data signal output from the data signal generating section 301, and outputs the result to the transmitting/receiving sections 103.

The reference signal generating section 303 (generating section) generates a reference signal to transmit in a reference signal transmission period (first signal transmission period), and outputs the signal to the mapping section 305. As noted earlier, the reference signal is a signal for measuring received quality, and, typically, a discovery signal is used. Note that other signals for received quality measurements such as the CRS, the CSI-RS, the DM-RS and so on may be used as reference signals as well.

The determining section 304 determines the transmission bandwidth in the reference signal transmission period based on the gain by the beamforming in the beamforming section 302 (beamforming gain). To be more specific, the determining section 304 determines the transmission bandwidth of the reference signal transmission period narrower than in the data transmission period, based on the beamforming gain in the data transmission period. By this means, the transmission power of the reference signal period increases beyond the data transmission period, in proportion to the transmission bandwidth.

The mapping section 305 maps the reference signal generated in the reference signal generating section 303 to the radio resource of the transmission bandwidth determined in the determining section 304. To be more specific, the mapping section 305 allocates the reference signal to a band associated with information that is specific to the small base station 12, and transmits the reference signal. For example, the mapping section 305 may apply frequency hopping to the reference signal based on a predetermined hopping pattern (example 1). Here, in the mapping section 305, the reference signal may be mapped to a single band that varies per first transmission period, based on a hopping pattern (example 1.1), or may be divided between and mapped to a plurality bands (example 1.2). Also, in the mapping section 305, the reference signal may be mapped to different bands that vary per predetermined time within a first transmission period, based on a hopping pattern (example 1.3).

Also, the mapping section 305 may apply direct spectrum spreading to the reference signal based on a predetermined spreading code sequence (example 2). To be more specific, the mapping section 305 may spread the reference signal based on a spreading code sequence that is determined on a fixed basis (example 2.1), or spread the reference signal based on a spreading code sequence that change per reference signal transmission period (example 2.2).

Also, the mapping section 305 may map the reference signal to a band associated with information that is specific to each small base station (example 3).

Also, the mapping section 305 may map the reference signal to a predetermined band based on information about the allocation of reference signal bands, reported from the macro base station 11 (example 4).

The reference signal that is mapped to a radio resource in the mapping section 305 is output to the transmitting/receiving section 103, and transmitted, in the reference signal transmission period, in a narrower transmission bandwidth and with greater transmission power than in the data transmission period. By this means, the reference signal is transmitted with greater transmission power than in the data transmission period. Note that the transmission section of the present invention is formed with the mapping section 305 and transmitting/receiving section 103.

Figure 20:
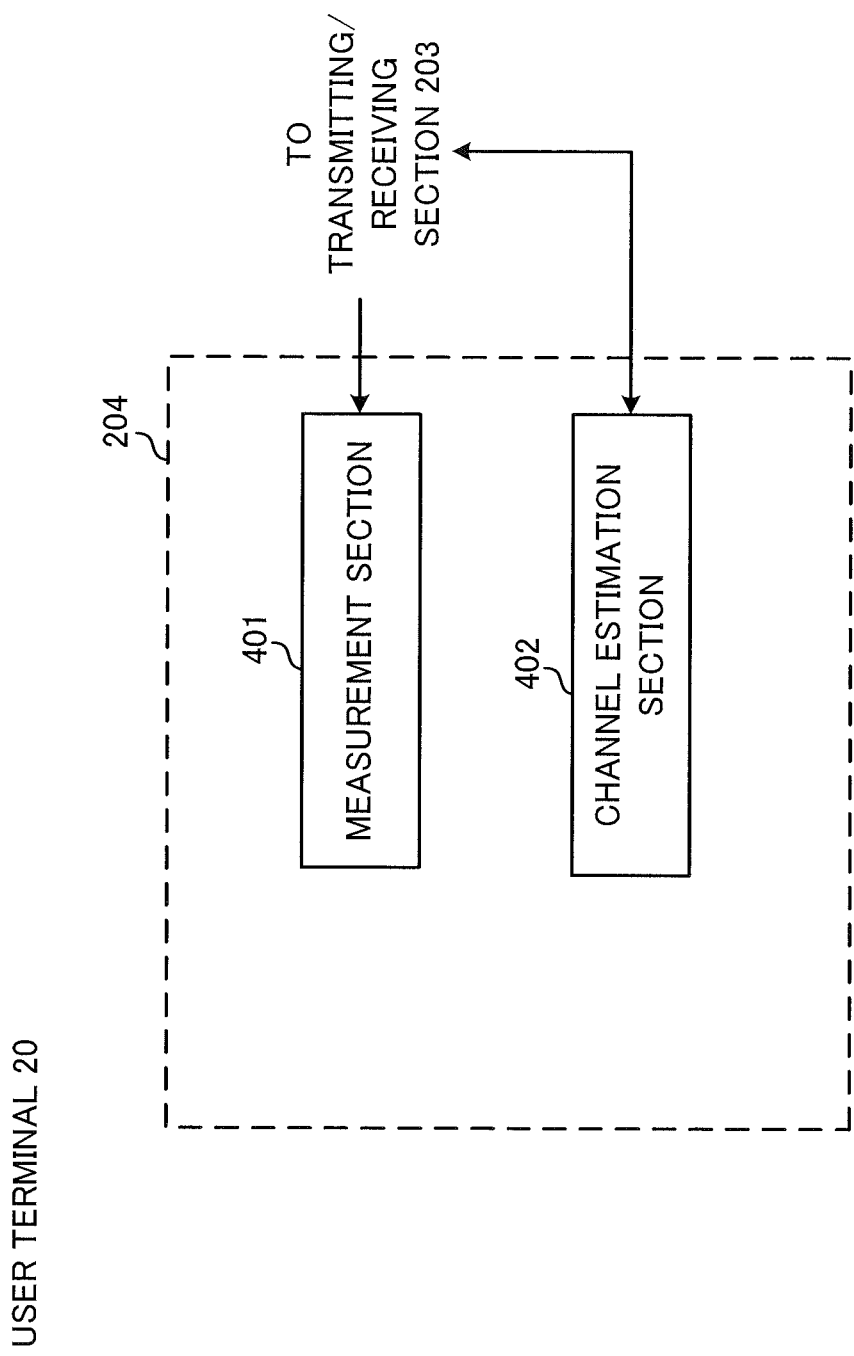
FIG. 20 is a diagram to explain a functional structure of a user terminal according to the present embodiment.

FIG. 20 is a diagram to show a functional structure of a user terminal 20 according to the present embodiment. Note that the following functional structure is formed with the baseband signal processing section 204 provided in the user terminal 20 and so on. As shown in FIG. 20, the user terminal 20 has a measurement section 401 and a channel estimation section 402.

The measurement section 401 receives, from the transmitting/receiving sections 203, a reference signal which the small base station 12 has allocated to a band associated with information that is specific to the small base station 12 and transmitted, and measures the received quality of the reference signal. To be more specific, the measurement section 401 de-spreads a reference signal that has been spectrum-spread based on a predetermined random number sequence, and measures the received quality of the reference signal (examples 1 and 2). Also, the measurement section 401 measures the received quality of a reference signal that is allocated to a predetermined band (examples 3 and 4). Here, information that is necessary to measure received quality, such as information about the random number sequence, the hopping pattern, the spreading code sequence, the band where the reference signal is allocated and so on may be reported from the macro base station, the small base station, other user terminals and so on. Also, as noted earlier, the received quality may include the RSRP, the RSRQ, the SINR and so on.

The channel estimation section 402 carries out channel estimation based on the received quality measured in the measurement section 401. To be more specific, the channel estimation section 402 generates channel state information (CSI) that corresponds to the received quality measured in the measurement section 401, and outputs this to the transmitting/receiving sections 203. Note that the CSI may include the CQI (Channel Quality Indicator), the PMI (Precoding Matrix Indicator), the RI (Rank Indicator) and so on.

As described above, according to the radio communication system 1 of the present embodiment, small base stations 12 allocate reference signals to bands that are associated with information that is specific to each small base station 12, and transmit the reference signals. To be more specific, with the radio communication system 1 according to examples 1 and 2 of the present embodiment, small base stations 12 apply spectrum spreading to reference signals based on predetermined random number sequences and transmit the reference signals. Also, with the radio communication system 1 according to example 3 of the present embodiment, small base stations 12 allocate reference signals to bands associated with information that is specific to each small base station, and transmit the reference signals. Also, with the radio communication system 1 according to example 4 of the present embodiment, small base stations 12 map reference signals to predetermined bands based on information about the allocation of reference signal bands that is reported from the macro base station 11. Consequently, even when beamforming is not applied to reference signals, it is still possible to reduce the interference between the small cells, and achieve both expanded coverage with increased reference signal transmission power and improved received quality of reference signals in user terminals.

Note that, although the radio communication system 1 according to the present embodiment is designed to transmit reference signals in a narrower transmission bandwidth and with greater transmission power in reference signal transmission periods than in data transmission periods, this is by no means limiting. The present invention is applicable even when the transmission bandwidth is not narrowed.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2013-171534, filed on Aug. 21, 2013, including the specification, drawings and abstract, is incorporated herein by reference in its entirety.

The invention claimed is:

1. A terminal comprising:
a receiver that receives:
    a downlink signal including a synchronization signal, a reference signal, and a broadcast channel, and
    a downlink data signal;
a processor that performs a power measurement of a received power of the downlink signal; and
a transmitter that transmits a measurement report including the power measurement of the received power of the downlink signal,
wherein:
    the power of the downlink signal is offset from the power of the downlink data signal,
    a bandwidth of the downlink signal is narrower than a bandwidth of the downlink data signal, and
    a beam based on the measurement report is applied to the downlink data signal.

2. The terminal according to claim 1, wherein the receiver receives information that indicates resources of the downlink signal.

3. A base station comprising:
a transmitter that transmits:
    a downlink signal including a synchronization signal, a reference signal, and a broadcast channel, and
    a downlink data signal; and
a receiver that receives a measurement report including a power measurement of a received power of the downlink signal,
wherein:
    the power of the downlink signal is offset from the power of the downlink data signal,
    a bandwidth of the downlink signal is narrower than a bandwidth of the downlink data signal, and
    a beam based on the measurement report is applied to the downlink data signal.

4. The base station according to claim 3, wherein the transmitter transmits information that indicates resources of the downlink signal.

* * * * *